(12) United States Patent
Fuller et al.

(10) Patent No.: US 11,195,145 B2
(45) Date of Patent: Dec. 7, 2021

(54) BLOCKCHAIN LEDGERS OF MATERIAL SPECTRAL SIGNATURES FOR SUPPLY CHAIN INTEGRITY MANAGEMENT

(71) Applicant: International Business Machines Corporation, Armonk, NY (US)

(72) Inventors: Nicholas C. M. Fuller, North Hills, NY (US); Prabhakar Kudva, New York, NY (US); Deborah Ann Neumayer, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/592,039

(22) Filed: Oct. 3, 2019

(65) Prior Publication Data
US 2020/0051008 A1 Feb. 13, 2020

Related U.S. Application Data

(63) Continuation of application No. 15/837,763, filed on Dec. 11, 2017, now Pat. No. 10,685,323, and a
(Continued)

(51) Int. Cl.
| G06Q 10/08 | (2012.01) |
| G06K 7/12 | (2006.01) |
| H04L 9/32 | (2006.01) |

(52) U.S. Cl.
CPC .......... G06Q 10/087 (2013.01); G06K 7/12 (2013.01); H04L 9/3236 (2013.01); H04L 9/3247 (2013.01); H04L 2209/38 (2013.01)

(58) Field of Classification Search
CPC ....... G06K 7/12; H04L 9/3236; H04L 9/3247; G01N 21/62; G01N 21/658; G06Q 10/087; G06Q 20/203
See application file for complete search history.

(56) References Cited

U.S. PATENT DOCUMENTS

| 8,352,297 B1 | 1/2013 | Gil et al. |
| 2006/0100920 A1 | 5/2006 | Pretorius et al. |
| (Continued) | | |

FOREIGN PATENT DOCUMENTS

| CN | 105393260 A | 3/2016 |
| CN | 106226286 A * | 12/2016 |
| (Continued) | | |

OTHER PUBLICATIONS

Capt. Jeff Werner in Diesel Digest , Mar. 10, 2015, "Even well maintained fuel tanks have microbial growth" (Year: 2015).*
(Continued)

*Primary Examiner* — Florian M Zeender
*Assistant Examiner* — Vanessa Deligi
(74) *Attorney, Agent, or Firm* — Amin, Turocy & Watson, LLP

(57) ABSTRACT

Techniques facilitating blockchain ledgers of material spectral signatures for supply chain integrity management are provided. In one example, a computer-implemented method comprises validating, by a device operatively coupled to a processor, spectral signature data associated with a material, resulting in validated spectral signature data; and generating, by the device, a set of information corresponding to a transaction of the material in a blockchain associated with the material, wherein the set of information is related to the validated spectral signature data. In some embodiments, the computer-implemented method further comprises authenticating, by the device, a first party device associated with a first party to the transaction and a second party device associated with a second party to the transaction and including identities of the first party and the second party as indicated by the respective party devices in the set of information.

20 Claims, 18 Drawing Sheets

Related U.S. Application Data continuation of application No. 15/467,725, filed on Mar. 23, 2017, now Pat. No. 10,467,586.

(56) References Cited

U.S. PATENT DOCUMENTS

| | | | |
|---|---|---|---|
| 2006/0230276 A1 | 12/2006 | Cok et al. | |
| 2006/0283931 A1 | 12/2006 | Polli et al. | |
| 2009/0001164 A1* | 1/2009 | Brock | G07D 7/0043 |
| | | | 235/462.01 |
| 2010/0045978 A1 | 2/2010 | Potuluri et al. | |
| 2011/0167010 A1 | 7/2011 | Soppera et al. | |
| 2016/0245692 A1 | 8/2016 | Haber | |
| 2016/0253622 A1 | 9/2016 | Srinivasan et al. | |
| 2016/0255078 A1 | 9/2016 | Zhang et al. | |
| 2016/0300234 A1 | 10/2016 | Moss-Pultz et al. | |
| 2016/0371704 A1* | 12/2016 | Akgun | G07C 3/00 |
| 2017/0083860 A1* | 3/2017 | Sriram | H04L 63/0823 |
| 2017/0292908 A1 | 10/2017 | Wilk et al. | |

FOREIGN PATENT DOCUMENTS

| | | |
|---|---|---|
| CN | 106330452 A | 1/2017 |
| CN | 106452785 A | 2/2017 |
| WO | 2016/181192 A1 | 11/2016 |

OTHER PUBLICATIONS

"Solutions", URL: https://www.consumerphysics.com/business/solutions/2016, Consumer Physics, Last accessed Oct. 28, 2016, 8 pages.
Crosbie, J., "The SCiO Mini-Spectrometer Will Analyze Your Food's Molecules for Fat, Sugar, and Calories", URL: https://www.inverse.com/article/16098-the-scio-mini-spectrometer-will-analyze-your-food-s-molecules-for-fat-sugar-and-calories, Invers, May 24, 2016, 8 pages.
Ellis et al., "Fingerprinting Food: Current Technologies for the Detection of Food Adulteration and Contamination", Chemical Society Reviews, vol. 41, No. 17, 2012, pp. 5706-5727.
Downey, G., "Spectroscopic Fingerprinting Techniques for Verifying Food", URL: http://jifsan.umd.edu/docs/csl10/section2/DowneyGerry-Spectroscopic_Fingerprinting.pdf., Methods and Systems for Tracking, Tracing and Verifying Foods, 10th CSL/JIFSAN Symposium, May 13-15, 2009, 36 pages.
Harnly et al., "Spectral Fingerprinting for Identification and Authentication of Foods and Botanical Botanical Supplements", URL: http://www.nutrientdataconf.org/pastconf/ndbc34/3-1_harnly.pdf, 34th National Nutrient Databank Conference, Jul. 12-14, 2010, 77 pages.
"Analysing four of the most contaminated foodstuffs", URL: http://www.specac.com/news/2016/03/16/analysing-four-of-the-most-contaminated-foodstuffs, Specac, Mar. 16, 2016, 6 pages.
Daskalov et al., "Application of Near Infrared Spectroscopy for Rapid Noninvasive Detection of Listeria Monocytogenes, *Escherichia coli* and *Staphylococcus aureus* Growth in Foods", Bulgarian Journal of Veterinary Medicine, vol. 14, No. 3, 2011, pp. 150-157.
Wikipedia, "2008 Chinese Milk Scandal", URL: https://en.wikipedia.org/wiki/2008_Chinese_milk_scandal, Last accessed Oct. 31, 2016, 30 pages.
"Provenance", URL: https://www.provenance.org/how_it_works, Last accessed Oct. 31, 2016, 7 pages.
"Skuchain", URL: https://www.skuchain.com/, Last accessed Oct. 31, 2016, 7 pages.
Alsmiller, C., "Applying the Blockchains to the Supply Chain", URL: https://appterra.com/effective-business-communications/applying-the-blockchains-to-the-supply-chain/, Appterra, Last accessed Oct. 31, 2016, 5 pages.
"Blockverify", URL: http://www.blockverify.io/, Last accessed Oct. 31, 2016, 8 pages.
Harnly, J., et al., "Detection of Adulterated Ginkgo biloba Supplements Using Chromatographic and Spectral Fingerprints", URL: http://www.ncbi.nlm.nih.gov/pmc/articles/PMC3762705/, Author manuscript, HHS Public Access, Last accessed Oct. 31, 2016, 10 pages.
Ianm, "Near Infrared Hyperspectral Imaging Detects Peanut Contamination", URL: http://www.impublications.com/content/near-infrared-hyperspectral-imaging-detects-peanut-contamination, IM Publications, Mar. 31, 2015, 2 pages.
"NOW® Foods Continues to Safeguard Product Safety and Purity", URL: http://www.nowfoods.com/Quality/Do-Supplements-Work/M095484.htm., NOW Heath Group, Jul. 26, 2013, 3 pages.
Harnly et al., "Abstract of Detection of Adulterated Ginkgo biloba Supplements Using Chromatographic and Spectral Fingerprints", URL: http://www.ncbi.nlm.nih.gov/pubmed/23451372, NCBI, Last accessed Oct. 31, 2016, 2 pages.
"Video Transcript: Rapid Screening of Pharmaceutical Imports in the United States", URL: http://www.fda.gov/Drugs/ScienceResearch/ResearchAreas/ucm425330.htm, U.S. Food & Drug Administration, Dec. 9, 2014, 3 pages.
"Building a better supply chain via the blockchain", URL: https://dailyfintech.com/2016/05/12/building-a-better-supply-chain-via-the-blockchain/, Daily Fintech, May 12, 2016, 3 pages.
"Welcome to the SPLASH Validation and Computational Page", URL: http://splash.fiehnlab.ucdavis.edu/, The SPLASH Collaboration, Last accessed Oct. 31, 2016, 5 pages.
"Development and Submission of Near Infrared Analytical Procedures", U.S. Food & Drug Administration, Mar. 2015, 24 pages.
"Thermo Fisher Scientific (TMO) Release: New Software And Cloud Solutions Provide Users With Advanced Customization", URL: http://www.biospace.com/News/thermo-fisher-scientific-release-new-software-and/422208, BioSpace, Jun. 6, 2016, 4 pages.
Douglas, S., "Open Provenance: A Peer-to-Peer Electronic Provenance System", URL: https://github.com/OpenProvenance/OPENPROV, GitHub, Last accessed Oct. 31, 2016, 6 pages.
"A guide to near-infrared spectroscopic analysis of industrial manufacturing processes", Metrohm Monograph, 2013, 46 pages.
"Metabolon", URL: http://www.metabolon.com/, Last accessed Oct. 31, 2016, 2 pages.
"ThermoFisher Scientific", URL: https://www.thermofisher.com/US/en/home.html, Last accessed Oct. 31, 2016, 2 pages.
"Thermo Fisher Case Study", URL: https://aws.amazon.com/solutions/case-studies/thermo-fisher/, Amazon Web Services, Last accessed Oct. 31, 2016, 3 pages.
Mell et al., "The NIST Definition of Cloud Computing", NIST Special Publication 800-145, National Institute of Standards and Technology, U.S. Department of Commerce, Sep. 2011, 7 pages.
International Search Report and Written Opinion received for PCT Application Serial No. PCT/IB2018/051920 dated Jun. 27, 2018, 8 pages.
Non-Final Office Action received for U.S. Appl. No. 15/467,725 dated Oct. 18, 2018, 61 pages.
Devdojo, "Local vs. Remote Servers", URL: https://devdogo.com/articles/local-vs-remote-servers, May 22, 2015, 3 pages.
List of IBM Patents or Applications treated as related.
Non-Final Office Action received for U.S. Appl. No. 15/837,763 dated Oct. 16, 2018, 44 pages.
spendmatters.com, "Why Bitcoin's Blockchain Technology Could Revolutionize Supply Chain Transparency", URL: http://spendmatters.com/2015/11/09/why-bitcoins-blockchain-technology-could-revolutionize-supply-chain-transparency/, Nov. 9, 2015, 9 pages.
Final Office Action received for U.S. Appl. No. 15/467,725 dated May 1, 2019, 34 pages.
Final Office Action received for U.S. Appl. No. 15/837,763 dated Apr. 24, 2019, 29 pages.
Notice of Allowance received for U.S. Appl. No. 15/467,725 dated Jun. 26, 2019, 58 pages.
Becker et al., "Fluorescence spectroscopy and PARAFAC in the analysis of yogurt", Chemometrics and Intelligent Laboratory Systems, vol. 75, No. 2, Feb. 28, 2005, 1 page.
U.S. Appl. No. 15/837,763, filed Dec. 11, 2017.
U.S. Appl. No. 15/467,725, filed Mar. 23, 2017.
Notice of Reasons for Refusal for Japanese Patent Application No. 2019-551457 dated Aug. 17, 2021.
Akira, et al., "A strategy and High Security Business Network of transactions" from "a block chain technique and IBM's efforts" (the

(56) References Cited

OTHER PUBLICATIONS revolution of the business), and PROVISION, Japan Institute of International Patent, Ltd., Feb. 23, 2017, 2017 No.91,pp. 34-39.

* cited by examiner

BLOCKCHAIN LEDGERS OF MATERIAL SPECTRAL SIGNATURES FOR SUPPLY CHAIN INTEGRITY MANAGEMENT

BACKGROUND

The subject disclosure relates to supply chain management, and more specifically, to blockchain ledgers for managing integrity of a supply chain.

Recent developments in supply chain management have led to the implementation of blockchains for supply chain integrity assurance. One such example is the open source platform Provenance created by Project Provenance Ltd. As stated in *Building a better supply chain via the blockchain*," Daily Fintech (May 12, 2016), available online at https://dailyfintech.com/2016/05/12/building-a-better-supply-chain-via-the-blockchain: "[Provenance's] framework consists of a series of interoperable modules deployed onto the blockchain by various supply chain actors (Supplier, Manufacturer, Registrar, Standards Organisations, Certifiers and Auditors and finally Consumer), each able to access a fully auditable record of transactions for the product in question."

Existing blockchain-based supply chain management solutions provide integrity management by means such as using tags to avoid counterfeiting; utilizing records of each point of transactions, billing contracts for various components, stock keeping unit (SKU) stamps, similar product identifiers, and/or other information to record a transaction at a point in the supply chain and its relevant subcomponents; etc. However, simply using billing and transaction records, packaging or additional markers, identifiers and/or tags on products, while useful in proving provenance, is not sufficient in many cases to ensure the integrity of a product and its associated supply chain. Further, such documentation is itself prone to counterfeiting. Accordingly, there exists a need in the art for supply chain integrity management solutions that provide increased robustness and security.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment, a computer-implemented method can include validating, by a device operatively coupled to a processor, spectral signature data associated with a material, resulting in validated spectral signature data, and generating, by the device, a set of information corresponding to a transaction of the material in a blockchain associated with the material, where the set of information is related to the validated spectral signature data. Advantages of the above computer-implemented method include improved supply chain integrity assurance by identifying as well as deterring any adulteration or contamination of the material during transit along the supply chain. Advantages of the above computer-implemented method further include an additional layer of security added via the spectral signature data recorded in a blockchain at each point, especially in cases where existing techniques are not sufficient or are deemed too weak.

Implementations of the above computer-implemented method can also include authenticating, by the device, a first party device associated with a first party to the transaction and a second party device associated with a second party to the transaction and including a first identity of the first party as indicated by the first party device and a second identity of the second party as indicated by the second party device in the set of information, where the validated spectral signature data includes a first spectral signature for the material as measured by the first party device and a second spectral signature for the material as measured by the second party device. Advantages of the above features include improved supply chain security by verifying that both the parties to the supply chain and their measured spectral signatures are genuine.

Implementations of the above computer-implemented method can further include inserting an encrypted signature in the set of information, where the encrypted signature utilizes the validated spectral signature data and a product tag associated with the material. Advantages of the above feature include further improved supply chain security by associating spectral signature data with its associated material, making a spectral signature for the material more difficult to counterfeit.

According to another embodiment, a system can include a memory that stores computer executable components and a processor that executes computer executable components stored in the memory, where the computer executable components include a validation component that validates spectral signature data associated with a material, resulting in validated spectral signature data, and a mining component that facilitates generation of a set of information corresponding to a transaction of the material in a blockchain associated with the material, where the set of information is related to the validated spectral signature data. The above system provides similar advantages to those described above for the previously noted computer-implemented method.

According to yet another embodiment, a computer program product can comprise a computer readable storage medium having program instructions embodied therewith. The program instructions can be executable by a processing component to cause the processing component to validate, by the processor, spectral signature data associated with a material, resulting in validated spectral signature data, and generate, by the processor, a set of information corresponding to a transaction of the material in a blockchain associated with the material, where the set of information is related to the validated spectral signature data. The above computer program product provides similar advantages to those described above for the previously noted system and computer-implemented method.

DETAILED DESCRIPTION

Figure 1:
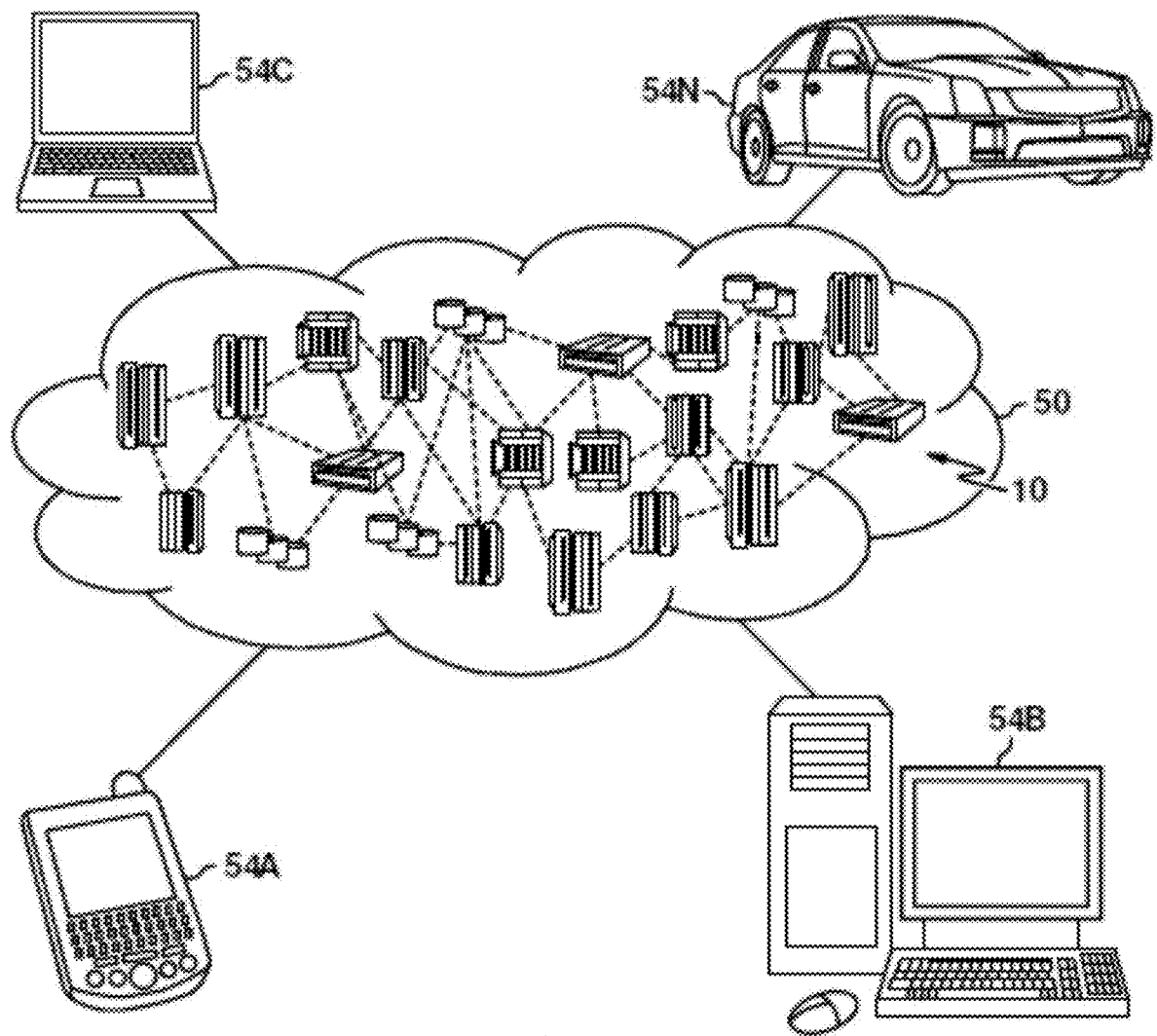
FIG. 1 is a diagram depicting a cloud computing environment according to one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
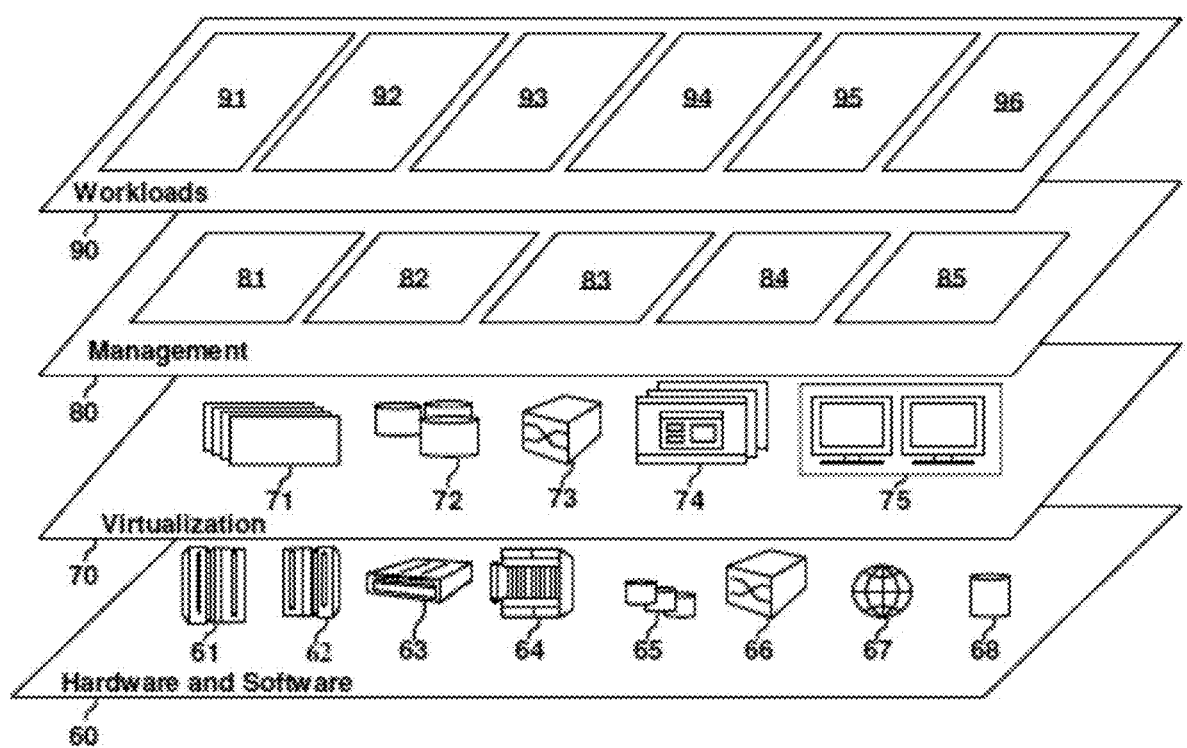
FIG. 2 is a diagram depicting abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and one or more embodiments of the invention are not so limited. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain management 96.

In the course of modern commerce, goods (products, materials, etc.) can pass between multiple entities from an initial producer of the goods to their end consumer. This series of entities is commonly referred to as a "supply chain." As a product can change hands multiple times within a supply chain, be incorporated into other products, etc., techniques to verify that quality and genuineness of the product are maintained along the supply chain are useful. For example, a buyer of a product along a supply chain can find it useful to verify properties such as the following:

Contents, e.g., that the ingredients of a product are actually as claimed. This can include verifying that there was no adulteration or contamination along the supply chain, and if there indeed was, identifying the location of such contamination as a deterrent and/or as a computer-implemented method facilitating tracking.

Sourcing and provenance, e.g., that the product was not substituted in whole or in part along the supply chain, even with similar contents. Examples can include provenance for fair-trade, environmental issues, regional authenticity, farm raised versus wild, pesticide use, supplement contamination, nut allergies, etc.

Regulation. In a multi-part supply chain, regulators and intelligence can track sources with risks, quality (e.g., even though medication may have named ingredients, whether they are in the approved proportions), etc.

As noted above, current solutions that implement blockchains for provenance in supply chains can be limited in their technical capacity in that, e.g., simply using billing and transactions records, packaging or additional markers, identifiers and tags on products, while useful in proving provenance, may not be sufficient in many cases (such as in the case of contaminated foodstuffs, replacement of claimed high end ingredients with differently sourced ones, etc.). Further such documentation can itself be prone to counterfeiting.

One or more embodiments described herein can mitigate the problems encountered in previous approaches by utilizing spectral fingerprinting to enhance the security of blockchain tracking. In some cases (e.g., diamonds or other precious gems/metals, high end beverages or other food products, supplements, medications, etc.), provenance can utilize point-to-point tracking (e.g., not just at the source or destination) of actual spectral signatures of the material involved in the transactions, beyond just tags or bills of transactions, in order to both deter and/or to identify any adulteration or contamination of the product during transit from origin to consumer. The spectral signature data recorded in a blockchain at respective points in the supply chain add yet another layer of security, especially in cases where existing techniques may not prove sufficient or are deemed too weak. In this way, the use of spectral fingerprinting can be an additional safeguard for blockchain-based supply chain validation methods.

The techniques described herein can be applied to products in a wide variety of fields, which can include, but are not limited to, agriculture, pharmaceuticals, chemicals, biological samples, food supply, industrial, automotive, etc. Further, the techniques described herein can be adapted to identity, mitigate, and/or deter a variety of inorganic or organic material issues along a supply chain. These issues can include, but are not limited to, contamination along the supply chain, substitutions in quality, poor handling (e.g., refrigeration, heat, humidity, etc.), or the like. The product fields and/or issues described above are provided merely as non-limiting examples, and other fields and/or issues are also possible.

Figure 3:
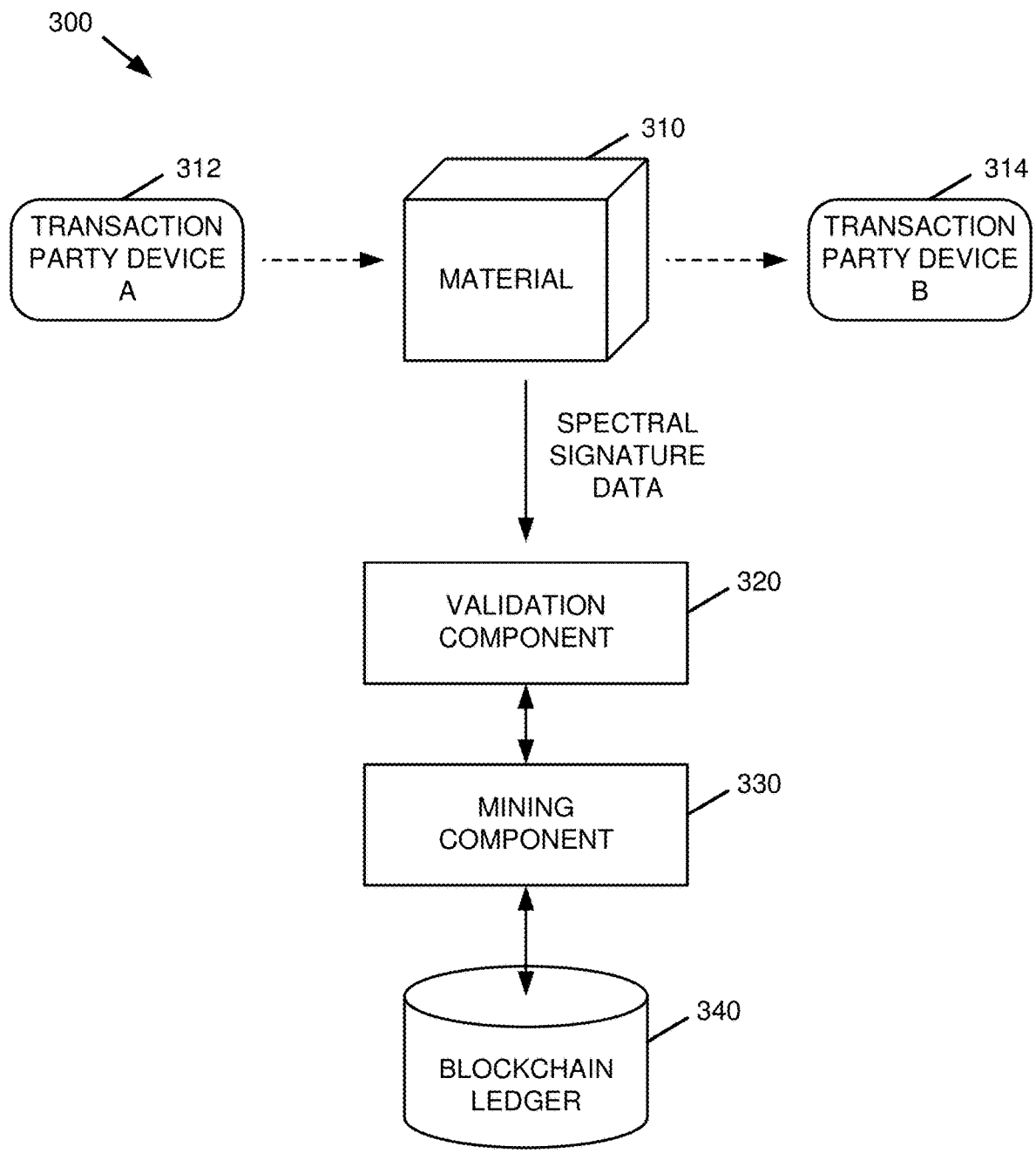
FIG. 3 is a block diagram of a system that facilitates blockchain ledgers of material spectral signatures for supply chain integrity management according to one or more embodiments described herein.

FIG. 3 is a block diagram of a system that facilitates blockchain ledgers of material spectral signatures for supply chain integrity management according to one or more embodiments described herein. Repetitive description of like elements employed in other embodiments described herein is omitted for sake of brevity.

With reference now to FIG. 3, a system 300 that facilitates blockchain ledgers of material spectral signatures for supply chain integrity management is shown. The system 300 can operate with respect to a material 310, which can be an organic (e.g., food, supplements, etc.) or inorganic (e.g., plastics, metals, etc.) material. It should be appreciated that while a material 310 is illustrated in FIG. 3, the concepts described with respect to FIG. 3 and/or other embodiments provided herein can be utilized with respect to any suitable good, product, and/or other object for which transactions along a supply chain are conducted.

Here, the material 310 can be the subject of a transaction between two parties that can respectively conduct the transaction via transaction party devices 312 and 314. The transaction party devices 312, 314 are devices at the location of, or affiliated with, the parties to the transaction of the material 310. The transaction party devices 312, 314 can be computing devices, e.g., desktop or laptop computers, servers, etc., that manage various aspects of the transaction which can include, but are not limited to, inventory tracking, sale terms, or the like. In some embodiments, the functionality of the transaction party devices 312, 314 can respectively be implemented via single unit or can be distributed across multiple computing devices.

For simplicity of explanation, the first party associated with the first transaction party device 312 is referred to herein as a sending party, and the second party associated with the second transaction party device 314 is referred to herein as a receiving party. However, the embodiments described herein can be applied to other transactional arrangements, such as transactions between one party and multiple parties, transactions between multiple parties and other multiple parties, transaction between one party and the same party (e.g., internal movement/storage of materials), etc. It should be appreciated that in in various embodiments, the parties to a transaction represent respective transaction party devices, such as devices 312, 314, that carry out the transaction.

As further shown in FIG. 3, the system 300 can include a validation component 320 and a mining component 330 that facilitate the generation of data corresponding to a transaction of the material 310 between the transaction party devices 312, 314. More particularly, the validation component 320 can be configured to validate spectral signature data associated with the material 310 in accordance with various aspects as described herein. Validation of the spectral signature data can result in validated spectral signature data. The mining component 330 can be configured to facilitate generation of a set of information corresponding to the transaction of the material 310. The set of information associated with the mining component 330 can be related to the validated spectral signature data from the validation component 320, e.g., the set of information includes and/or otherwise references or indicates the validated spectral signature data.

In one aspect, the set of information associated with the mining component 330 can be a block and/or other data record in a blockchain associated with the material 310. The set of information and/or other suitable information, e.g., a block and/or some or all of a blockchain associated with the block, can be stored at or otherwise maintained via a blockchain ledger 340. In one embodiment, the blockchain ledger 340 can be a database and/or other suitable data store that can maintain transaction data associated with the material 310.

In various aspects, the validation component 320, mining component 330, and blockchain ledger 340 can be associated with a single computing device or multiple computing devices. For instance, operations of the validation component 320 can be performed by a first computing device, operations of the mining component 330 can be performed by the first computing device and/or a second computing device, and operations of the blockchain ledger 340 can be performed by the first computing device, the second computing device, and/or a third computing device. As one example, the validation component 320 and/or mining component 330 can provide spectral signature data for the material 310 to a remote computing device, and in response the remote computing device can generate the set of information. Other configurations are also possible. Further, the functionality of individual ones of the components 320, 330, 340 shown in FIG. 3 can in some implementations be distributed across multiple computing devices.

Figure 4:
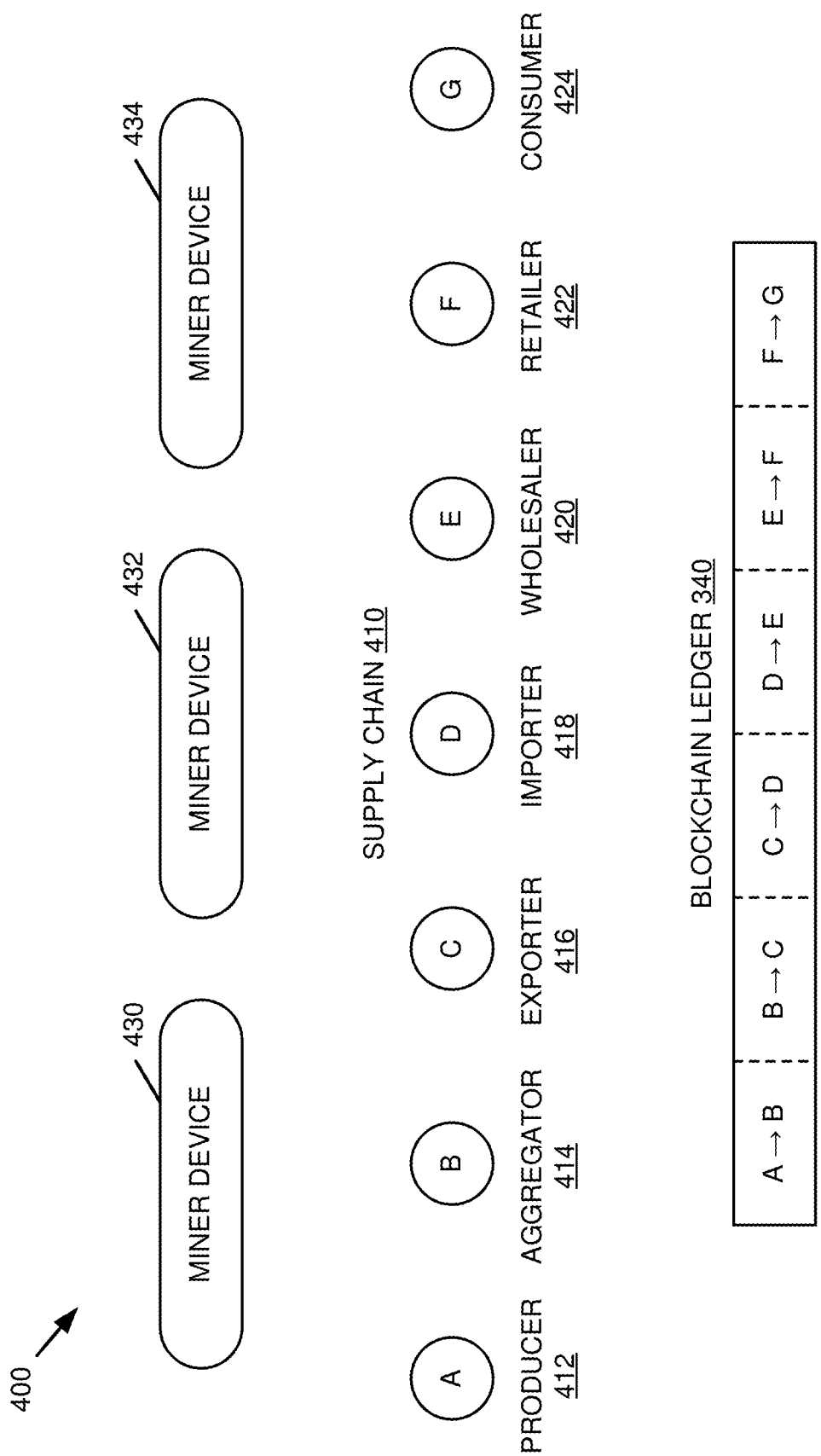
FIG. 4 is a diagram depicting an example, non-limiting supply chain in which one or more embodiments described herein can be facilitated.

Turning next to FIG. 4, shown is a diagram 400 depicting an example, non-limiting supply chain 410 in which one or more embodiments described herein can be facilitated. Repetitive description of like elements employed in other embodiments described herein is omitted for sake of brevity.

As shown in diagram 400, a supply chain 410 for a given material can include various parties (or devices of such parties, as described above with respect to FIG. 3) involved in the production and/or sale of the material. These can include, but are not limited to, a producer (e.g., farmer, manufacturer, etc.) 412, an aggregator 414, an exporter 416, an importer 418, a wholesaler 420, a retailer 422, and a consumer 424. It is to be appreciated that the supply chain 410 shown in FIG. 4 is merely an example of a supply chain that can be associated with a material, and other supply chain configurations could contain more or fewer parties and/or the same or different parties.

As further shown in FIG. 4, various miner devices 430, 432, 434 can be associated with the supply chain 410 and provide integrity monitoring for the various points on the supply chain 410 by, e.g., managing transaction records in a blockchain or other suitable structure and/or utilizing spectral signature data to enforce product consistency according to various embodiments described herein. In this way, the miner devices 430, 432, 434 can function as the validation component 320 and/or mining component 330 as shown in FIG. 3 and/or in other suitable manners. As additionally shown in FIG. 4, the miner devices 430, 432, 434 can produce or otherwise maintain a blockchain ledger 340 that can include one or more blocks containing supply chain transaction records for respective transactions between points on the supply chain 410. Various embodiments for operation of the miner devices 430, 432, 434 and maintenance of the blockchain ledger 340 are described in further detail herein.

In one embodiment, a block in a blockchain, and/or another suitable set of information, can be created at respective transactions in a supply chain, e.g., the supply chain 410, from an originator to the consumer. In addition to security provided via the blockchain structure, security for individual blocks of the blockchain can also be increased in other ways, as described below.

Validation of a blockchain that can be generated as described herein can be validated in various ways. For instance, on-the-spot verification, e.g., verification of transaction information by the validation component 320 and/or mining component 330 at the time of the underlying transaction, can be used to validate a transaction in substantially real time before adding a block to the blockchain. Alternatively, the steps of a supply chain can be validated with a given degree of certainty (e.g., a probability value) when the product reaches its final destination, e.g., by collecting transaction data for respective transactions along the supply chain and subsequently validating this transaction data at the conclusion of the supply chain. Other techniques could also be used.

In an aspect, transactions along the supply chain can be incorporated as standard blocks in a blockchain by the mining component 330. Respective generated blocks can include validated spectral signature data. For instance, a transaction record can contain an encrypted version of a spectral signature, e.g., a near infrared (NIR) signature, as measured by a device associated with the sender as well as NIR signature(s) as measured by a device associated with the receiver. Spectral signature data, such as NIR signatures or the like, can be incorporated into a block and/or other set of transaction information in various ways. A non-exhaustive listing of techniques for incorporating spectral signature data into a set of information, as well as operating principles for these respective techniques, are as follows.

In one embodiment, the mining component 330 can include the validated spectral signature data for the material 310 into the set of information generated for a transaction of the material 310, e.g., as part of a transaction record in the corresponding block of a blockchain. Here, the validation component 320 can elect to verify the integrity of the transaction record alone (e.g., not verify the spectral signature data itself but instead treat it as additional transaction data) before the mining component 330 adds the block containing the transaction record to the chain. For instance, the validation component 320 can obtain a hash of a spectral signature for the material 310 and check the validity of the hash as opposed to verifying the spectral signature itself.

Figure 5:
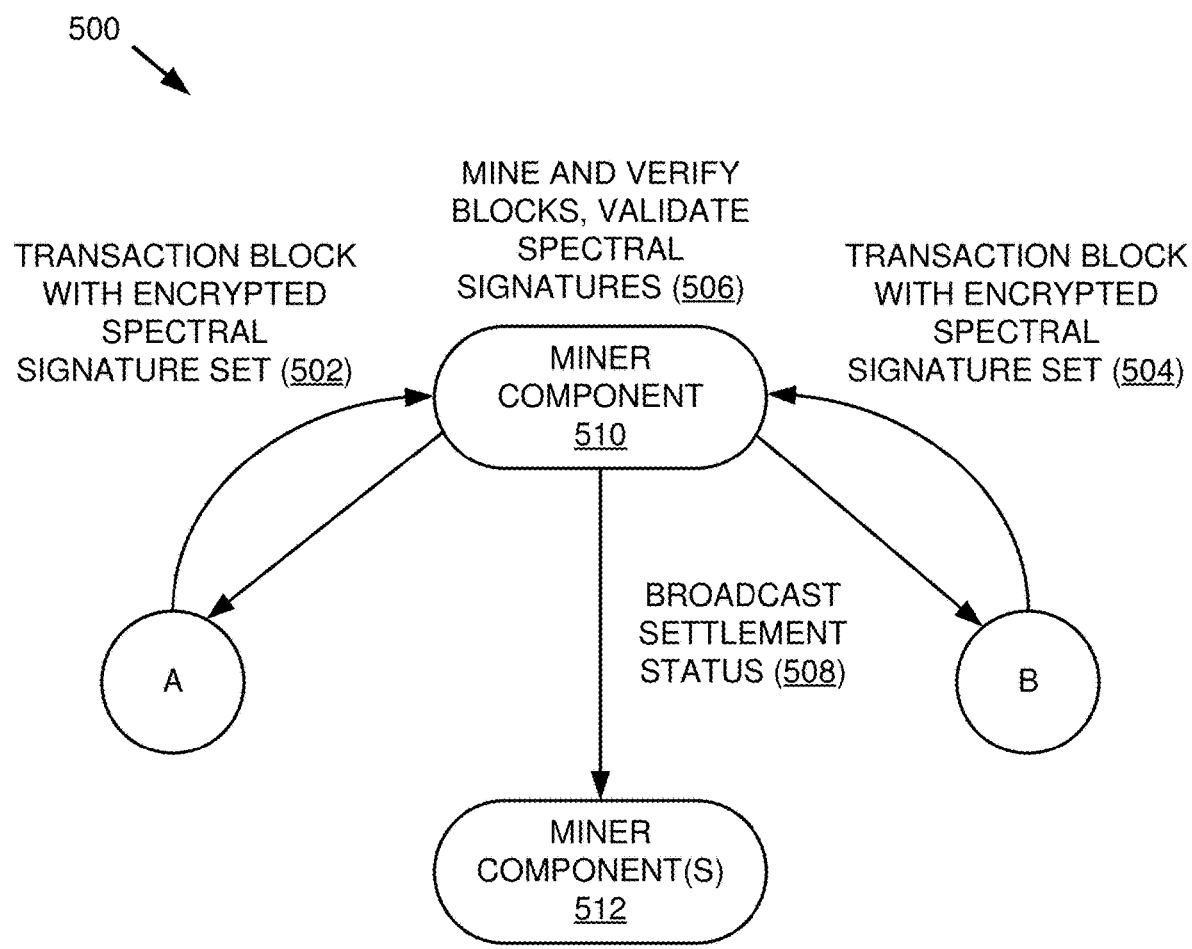
FIG. 5 is a diagram depicting example, non-limiting blockchain management operations performed between entities in a supply chain according to one or more embodiments described herein.

FIG. 5 is a diagram depicting example, non-limiting blockchain management operations performed between entities in a supply chain according to one or more embodiments described herein. Repetitive description of like elements employed in other embodiments described herein is omitted for sake of brevity.

Diagram 500 in FIG. 5 illustrates example operations of the above embodiment as performed by two miner components 510, 512. As shown by diagram 500, a first miner component 510 can receive encrypted spectral signature sets from transaction parties (e.g., via devices associated with the respective parties) A and B at operations 502 and 504, respectively. The miner components will verify the block representing the transaction by creating proof of work for the hash of the block, or through another consensus method. Once the transaction itself is verified, at operation 506, the miner component 510 can determine spectral signatures associated with the material 310. The mining performed at operation 506 can include validating the spectral signature sets received at operations 502 and 504, e.g., by validating hashes of the respective spectral signature sets. In response to successful validation of the spectral signature sets (e.g., as described with respect to FIG. 6), a settlement status of the transaction can be broadcast, e.g., to a second miner component 512 and/or other entities, at operation 508.

Figure 6:
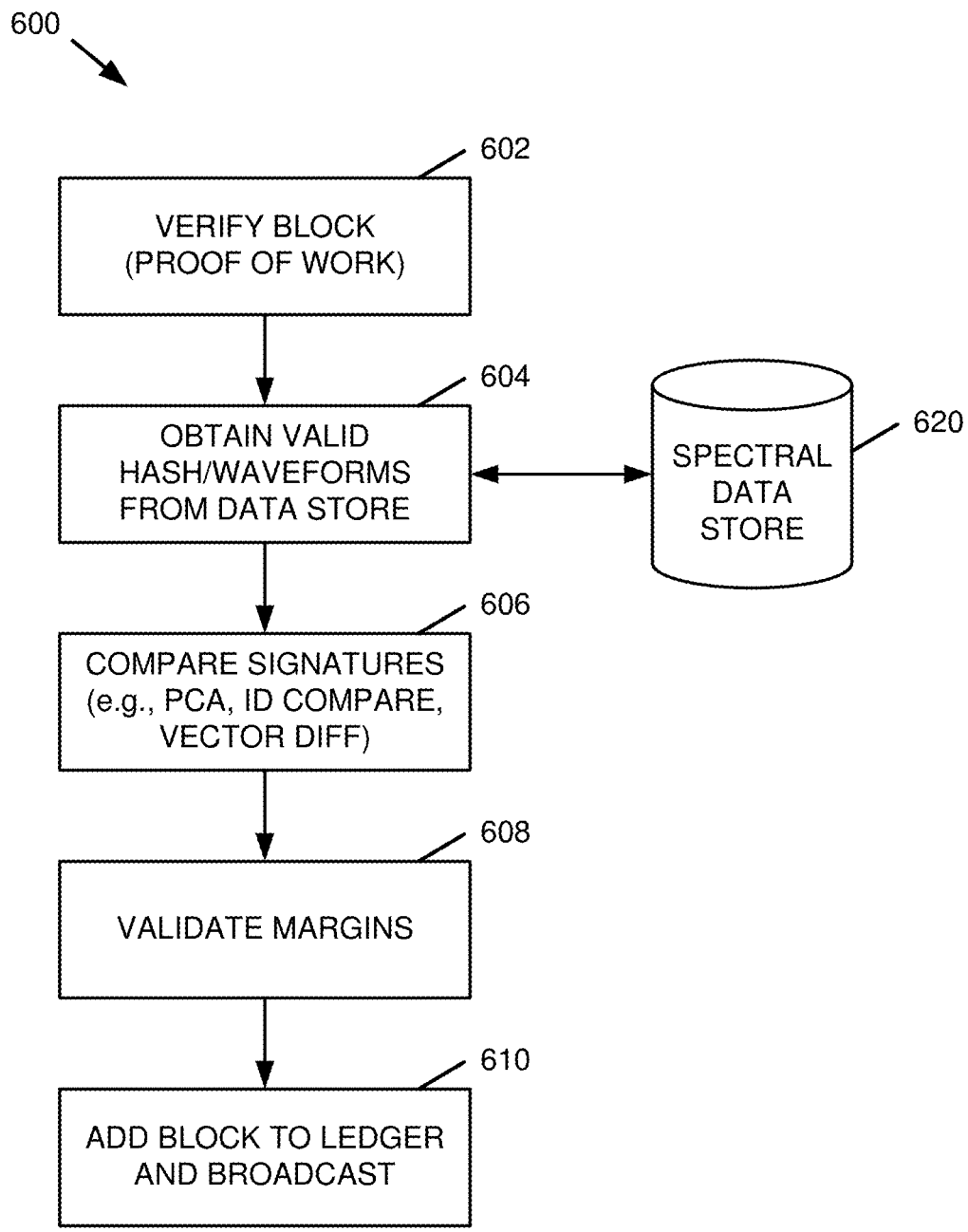
FIG. 6 is a flow diagram of an example, non-limiting computer-implemented method facilitating mining spectral signatures according to one or more embodiments described herein.

FIG. 6 is a flow diagram of an example, non-limiting computer-implemented method facilitating mining spectral signatures according to one or more embodiments described herein. An example operation flow for the validation and mining performed at operation 506 is illustrated by flow diagram 600 in FIG. 6. Repetitive description of like elements employed in other embodiments described herein is omitted for sake of brevity.

At 602, a new block in the blockchain can be validated (e.g., by the miner component 510), e.g., by generating proof of work corresponding to a new block and/or verifying proof of work corresponding to a block generated by another computing entity. Proof of work refers to computing operations performed (e.g., by the miner component 510 and/or another entity) in connection with the creation of the new block in the blockchain that are of sufficient computational complexity to discourage attempts to manipulate the blockchain by third-party attackers or other unauthorized entities.

At 604, valid hashes, waveforms, and/or other representations of spectral signature data for a material 310 can be obtained (e.g., by the miner component 510) from a spectral data store 620. The spectral data store 620 can be any suitable data structure (e.g., a database, a linked list, etc.) for storing information corresponding to spectral signatures of respective materials.

At 606, measured spectral signature data, e.g., from parties to a transaction of a material 310, can be compared (e.g., by the miner component 510) to the valid signature data obtained at 604. Various techniques can be utilized to compare the signature data. These techniques can include, but are not limited to, principal component analysis (PCA), identity comparison, vector differential computation, etc. Further, at 608, a margin validation can be performed (e.g., by the miner component 510) with respect to the spectral signature data.

At 610, in response to successful completion of the preceding operations, the new block can be added (e.g., by the miner component 510) to the corresponding blockchain ledger 340. The transaction can then be classified as settled, and the settlement status of the transaction can be broadcast as shown in FIG. 5.

Figure 7:
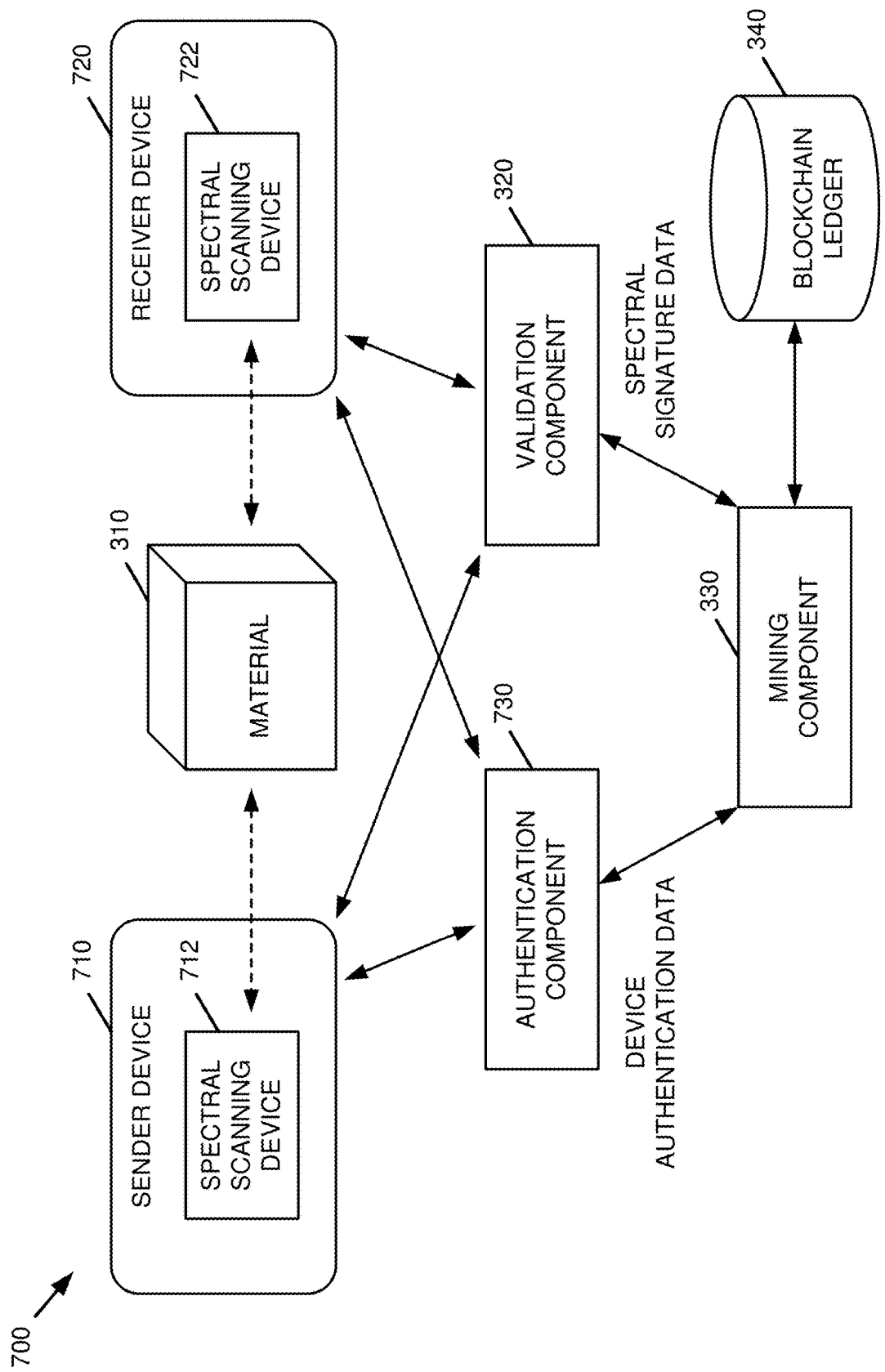
FIG. 7 is a block diagram of a system that facilitates blockchain management for a transaction of material between authenticated parties according to one or more embodiments described herein.

FIG. 7 is a block diagram of a system 700 that facilitates blockchain management for a transaction of material 310 between authenticated parties, e.g., parties represented by respective authenticated devices, according to one or more embodiments described herein. Repetitive description of like elements employed in other embodiments described herein is omitted for sake of brevity.

As shown in FIG. 7, the parties to a transaction of the material 310, here represented by a sender device 710 and a receiver device 720 (collectively the "party devices" 710, 720), can obtain respective independent spectral signature measurements via respective spectral scanning devices 712, 722. The spectral scanning devices 712, 722 can be handheld or freestanding spectrometers, e.g., NIR spectrometers, and/or any other device configured to obtain spectral signature readings for the material 310. Further, the functionality of the spectral scanning devices 712, 722 can be implemented by the party devices 710, 720 themselves, or the spectral scanning devices 712, 722 can be distinct devices that are connected to the party devices 710, 720 via a wired or wireless communication connection.

The spectral signature data obtained by the sender device 710 and the receiver device 720 can then be transmitted and/or otherwise communicated to the validation component 320, which can generate a set of information for the transaction in combination with the mining component 330 for entry in the blockchain ledger 340, as described above with respect to FIG. 3. In addition, the system 700 can further include an authentication component 730 configured to authenticate the sender device 710 and receiver device 720 and/or the respective spectral scanning devices 712, 722 in conjunction with the transaction.

In an aspect, the authentication component 730 can verify the identity of the sender device 710 and/or receiver device 720, the identity of the spectral scanning devices 712, 722 and/or the legitimacy of the spectral signature data received therefrom, and/or any other suitable aspects of a transaction. The authentication component 730 can then provide evidence of the authenticity of the party devices 710, 720 and/or their respective spectral signature data to the validation component 320 and/or the mining component 330 for inclusion in the blockchain ledger 340. For instance, in response to authenticating a first party to the transaction and a second party to the transaction (e.g., represented by the sender device 710 and receiver device 720), the mining component 330 can be configured to include a first identity of the first party and a second identity of the second party in the set of information for the transaction. Also or alternatively, the mining component 330 can include in the validated spectral signature data a first spectral signature for the material 310 as measured by the first party to the transaction (e.g., via the sender device 710) and a second spectral signature for the material 310 as measured by the second party to the transaction (e.g., via the receiver device 720).

In an aspect, the authentication component 730 can authenticate the party devices 710, 720 to a transaction, and the validation component 320 can verify spectral signature measurements from the party devices 710, 720, in a variety of ways. A non-exhaustive listing of operations that can be performed by the authentication component 730 and/or validation component 320 are as follows. Other operations to those described below are also possible.

In one example, the validation component can verify that spectral signature data obtained from the sender device 710 and receiver device 720, e.g., NIR signatures measured by the respective spectral scanning devices 712, 722, can be within a set of valid signatures. As used herein, a "set of valid signatures" can be a discrete listing, such as a set of valid spectral signatures (e.g., based on expectations for a particular product that can be known to the mining component 330, or from a database such as the spectral data store 620 in FIG. 6), or can comprise a range of signatures, such as a range of signatures within an allowed margin of a reference signature for a given material. Upon verifying that the spectral signature data is within the range of valid signatures, the validation component 320 can arrive at a consensus on whether the signatures were valid and record the results along with the block, e.g., via the mining component 330.

In another example, the respective spectral scanning devices 712, 722 can be configured to produce an encrypted signature that cannot be decrypted by the sender device 710 or receiver device 720. The encrypted signature can be encrypted using a key known to the mining component 330 such that the mining component can decrypt and facilitate verification of the signature. By utilizing encrypted signatures in this manner, cases of illegal activity can be avoided where a sender can use old signatures previously known to be valid for a product. In a further example, the sender device 710 and receiver device 720 can each utilize respective encryption keys for their information which can be subsequently decrypted by the mining component 330. In still another example, a set of N encryption keys can be associated with a given transaction, and data relating to the transaction can be encrypted using M of the N keys, where M is less than or equal to N.

In a further example, the preceding embodiment can be augmented by combining a product tag for the material 310 with the spectral signature data to generate a combined encrypted signature. In this example, the mining component 330 can then insert an encrypted signature into a set of information corresponding to the transaction, which utilizes the validated spectral signature data from the sender device 710 and receiver device 720 as well as the product tag for the material 310. Also or alternatively, the product tag can be combined with an encryption such that the respective spectral scanning devices 712, 722 are configured to solve the encryption to verify that the actually measured the product with that particular tag, e.g., the material 310. As another example, the sender device 710 can add a tag (e.g., which combines the product identifier for the material 310) for which the receiver device 720 can provide proof of work and incorporate the tag into the signature of the sender device 710.

Figure 8:
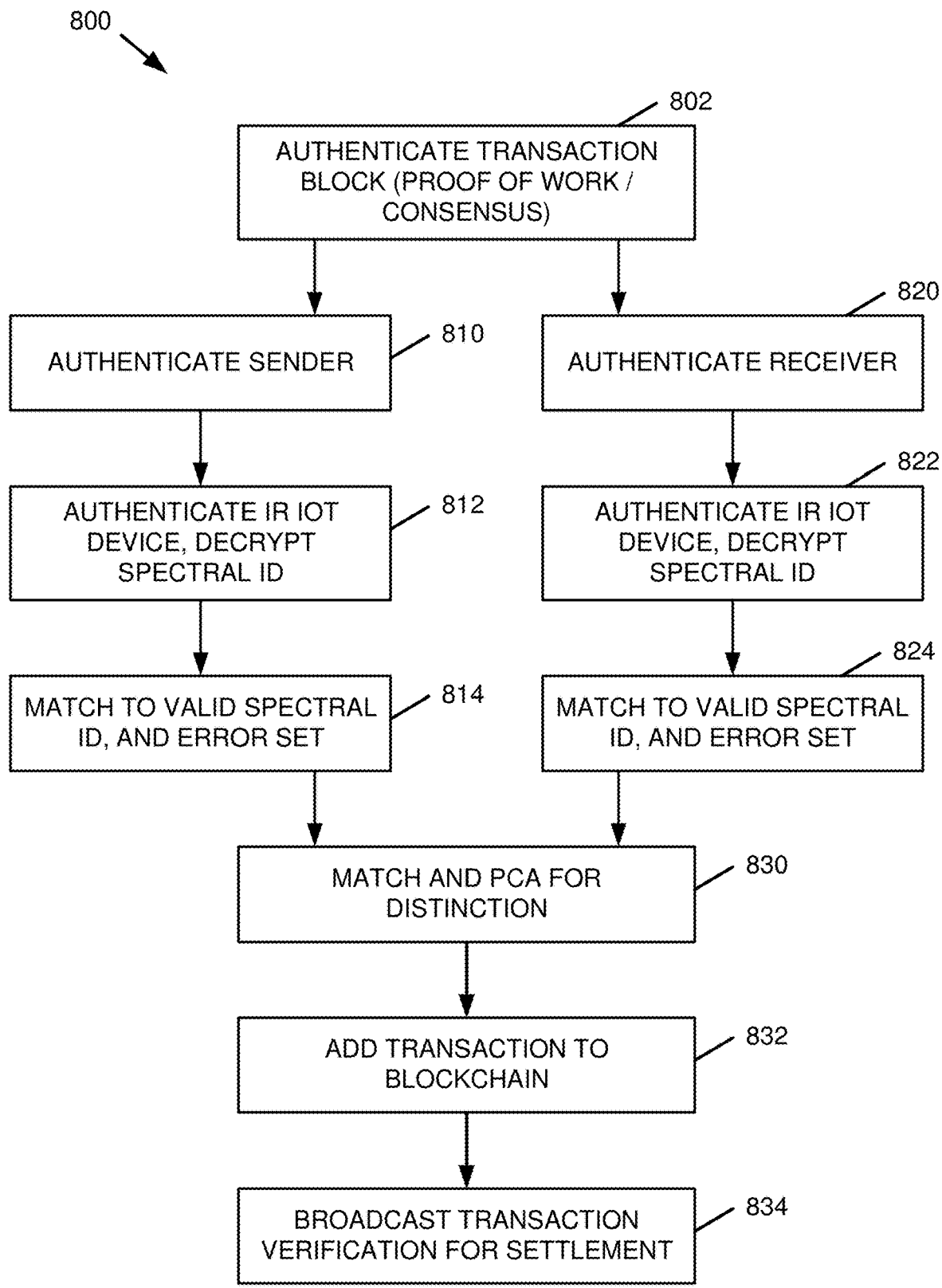
FIG. 8 is a flow diagram of an example, non-limiting computer-implemented method facilitating managing a multi-signature blockchain according to one or more embodiments described herein.

Referring now to FIG. 8, a flow diagram of an example method 800 for facilitating managing a multi-signature blockchain is provided. Repetitive description of like elements employed in other embodiments described herein is omitted for sake of brevity.

At 802, a set of information, e.g., a transaction block, is authenticated (e.g., by the authentication component 730). In one example, authenticating the transaction block at 802 can be performed via computing and/or otherwise providing proof of work corresponding to the block, and/or by any other method that can establish consensus between respective miners with respect to the block, as generally described above with respect to FIG. 6.

In response to the block authentication at 802, the method 800 can perform sender authentication at 810, 812, 814. More particularly, at 810, the sender device 710 for can be authenticated (e.g., via the authentication component 730). At 812, the spectral scanning device 712, e.g., an infrared (IR) internet of things (IOT) connected device, can also be authenticated (e.g., via the authentication component 730). At 814, spectral signature data provided by the spectral scanning device 712 can be verified (e.g., by the validation component 320 and/or authentication component 730), e.g., by matching the provided spectral signature data to a valid spectral identifier and/or an error set. In addition to the sender authentication at 810, 812, 814, the method 800 can additionally perform receiver authentication at 820, 822, 824 in a similar manner to that described above with respect to 810, 812, 814. It is to be appreciated that the sender authentication at 810, 812, 814 and the receiver authentication at 820, 822, 824 can be performed simultaneously or non-simultaneously in any suitable order. Further, various implementations of the method 800 can perform one, both, or none of the sender authentication at 810, 812, 814 and/or the receiver authentication at 820, 822, 824.

In response to successful sender and/or receiver authentication, the transaction data received from the sender device 710 and/or receiver device 720 can be matched, and/or analyzed via principal component analysis (PCA), for distinction (e.g., by the validation component 320). At 832, the transaction can be then added to the blockchain (e.g., by the mining component 330). At 834, the settlement status of the transaction, and/or information corresponding to verification of the transaction, can be broadcast (e.g., by the mining component 330), e.g., to one or more other miner and/or validator devices.

Figure 9:
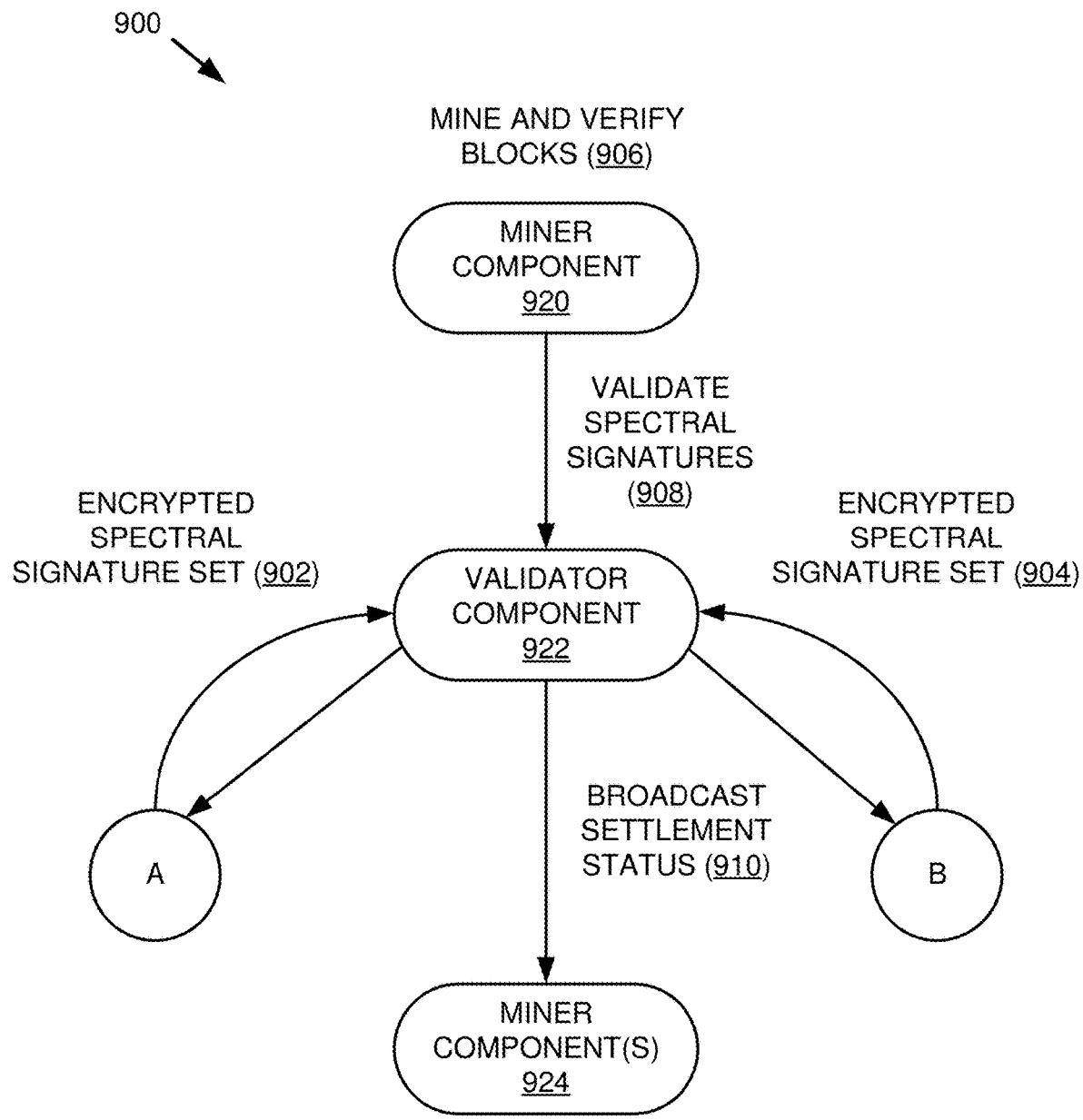
FIG. 9 is another diagram depicting example, non-limiting blockchain management operations performed between entities in a supply chain according to one or more embodiments described herein.

Turning next to FIG. 9, diagram 900 illustrates example operations that can be performed by miner components 920, 924, and a validator component 922 that can be distinct from the miner components 920, 924, with respect to a transaction of a material 310 between two parties represented by devices A and B. At 902 and 904, the validator component 922 can receive encrypted spectral signature sets corresponding to the material 310, e.g., spectral signature data measured by a spectral scanning device 712 and/or 722. At 906, the miner component 920 can perform spectral signature mining in a similar manner to that described above with respect to FIG. 5. The validator component can then separately validate the spectral signatures at 908. At 910, a settlement status of the transaction can be broadcast, e.g., to the miner component 924 and/or other entities.

Figure 10:
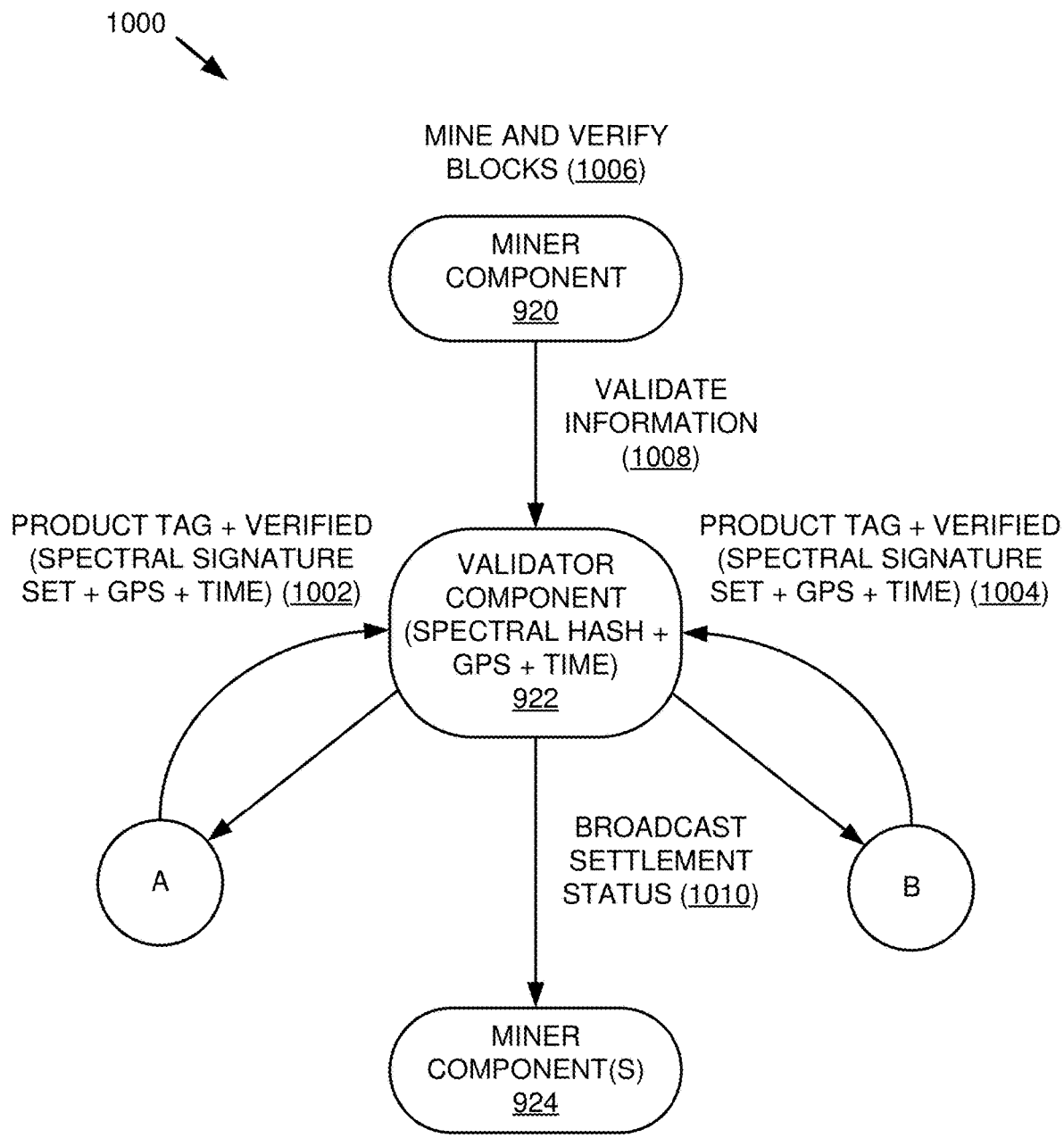
FIG. 10 is another diagram depicting example, non-limiting blockchain management operations performed between entities in a supply chain according to one or more embodiments described herein.

Diagram 1000 in FIG. 10 illustrates example operations that can be performed by the miner components 920, 924 and the validator component 922 in another embodiment. Here, in addition to spectral signature data, party devices A and B at 1002 and 1004, respectively, can provide additional information such as a product tag for the material 310, a location (e.g., GPS coordinates) associated with the material 310, time information (e.g., a time of the transaction, a time at which the spectral signature data was obtained, etc.), and/or other suitable information. In response to the spectral signature mining at 1006, the information provided at 1002 and 1004 can be validated by the validator component 922 at 1008. At 1010, a settlement status of the transaction can be then broadcast in a similar manner to 910 in FIG. 9.

In another embodiment, the product tag as used in diagram 1000 can itself contain a copy of the blockchain corresponding to the material 310. The inclusion of the history of the blockchain, as well as other information such as GPS coordinates and/or time data, can be useful for verification of tampering in transit, deterioration due to long transit time, proper sourcing of material, or the like.

With regard to the utilization of spectral signature information as described above, while various embodiments described herein utilize NIR signatures, other spectroscopy methods, such as Fourier transform infrared (FTIR), mid-infrared (MIR), and/or Raman spectroscopy could be used. Other spectroscopy methods are also possible.

Further, spectral hash signatures and/or reference spectral information for a given material can be generated and/or otherwise obtained in various manners. In one example, standardized spectral hash signatures can be used, e.g., which can be based on aggregate spectral signatures as opposed to individual elements) As another example, waveform data, such as fast Fourier transform (FFT), vectors, simplified waveforms, or the like, can be utilized to obtain a spectral signature.

Figure 11:
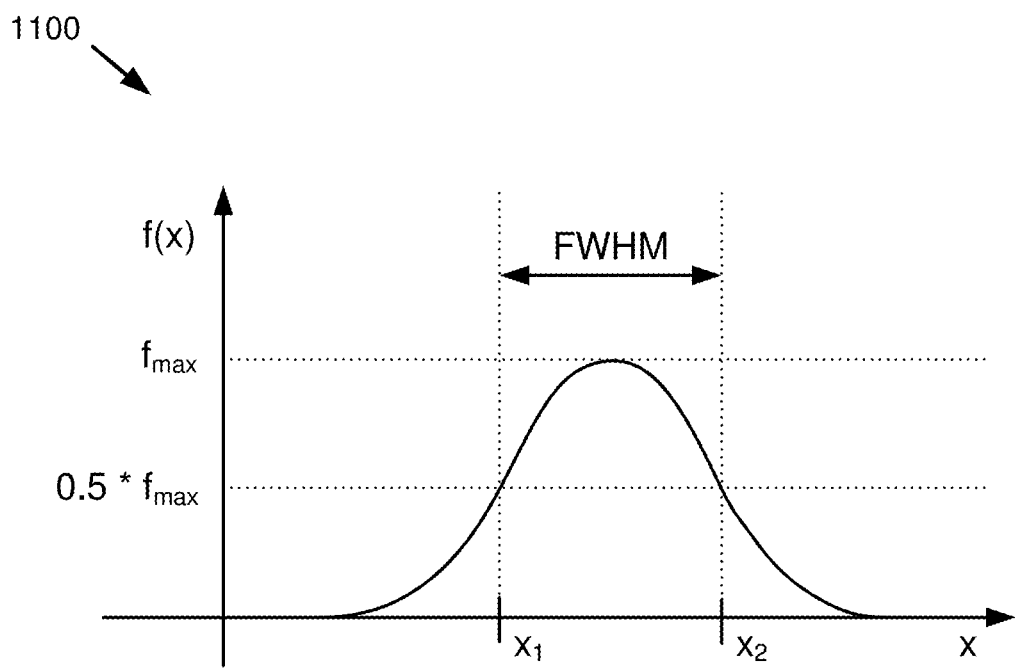
FIG. 11 is a diagram depicting example waveform characteristics that can be utilized in spectral signature generation according to one or more embodiments described herein.

As a further example, spectral signatures can be derived and/or otherwise obtained as a hashed and/or encrypted array. This can be based on properties such as normalized peak intensities (e.g., for a selected number N or a threshold) to a sample size, frequency/wavelengths at which peaks occur, full width at half maximum (FWHM) at the peaks, etc. Derivation of a FWHM for an example waveform is shown by diagram 1100 in FIG. 11.

As yet another example, an existing repository of spectral hash codes can be queried using a unique identifier corresponding to a material at issue. Such a unique spectral identifier can be used to generate a crypto hash key. For instance, a device utilized by the sender A of a product can submit a sending spectral identifier set (there may be one or more) in an encrypted form to the miner device without being able to see the content of the message (e.g., the message can be sent directly from the sender device to the miner device). The receiver B, via another corresponding device, can then do the same by sending a similar spectral identifier set encrypted to the miner device. The miner device can then match the two spectral identifier sets within a reasonable bound of error for that set. In addition, the miner device can perform proof of work on both submitted transactions to verify the authenticity of the messages and/or to establish consensus with other miner devices.

In an aspect, spectral hash codes and/or other spectral signature information can be made available as a database or other repository to respective miner and/or validator devices in the system. For instance, a cloud service can be provided that is populated with a spectroscopy database of respective products. Other implementations could also be used. In another aspect, blockchain management as generally described above can be provided as a cloud service that device along a supply chain can use for tracking in addition to, or independently of, the cloud-based spectroscopy database and/or encryption methods described herein.

Figure 12:
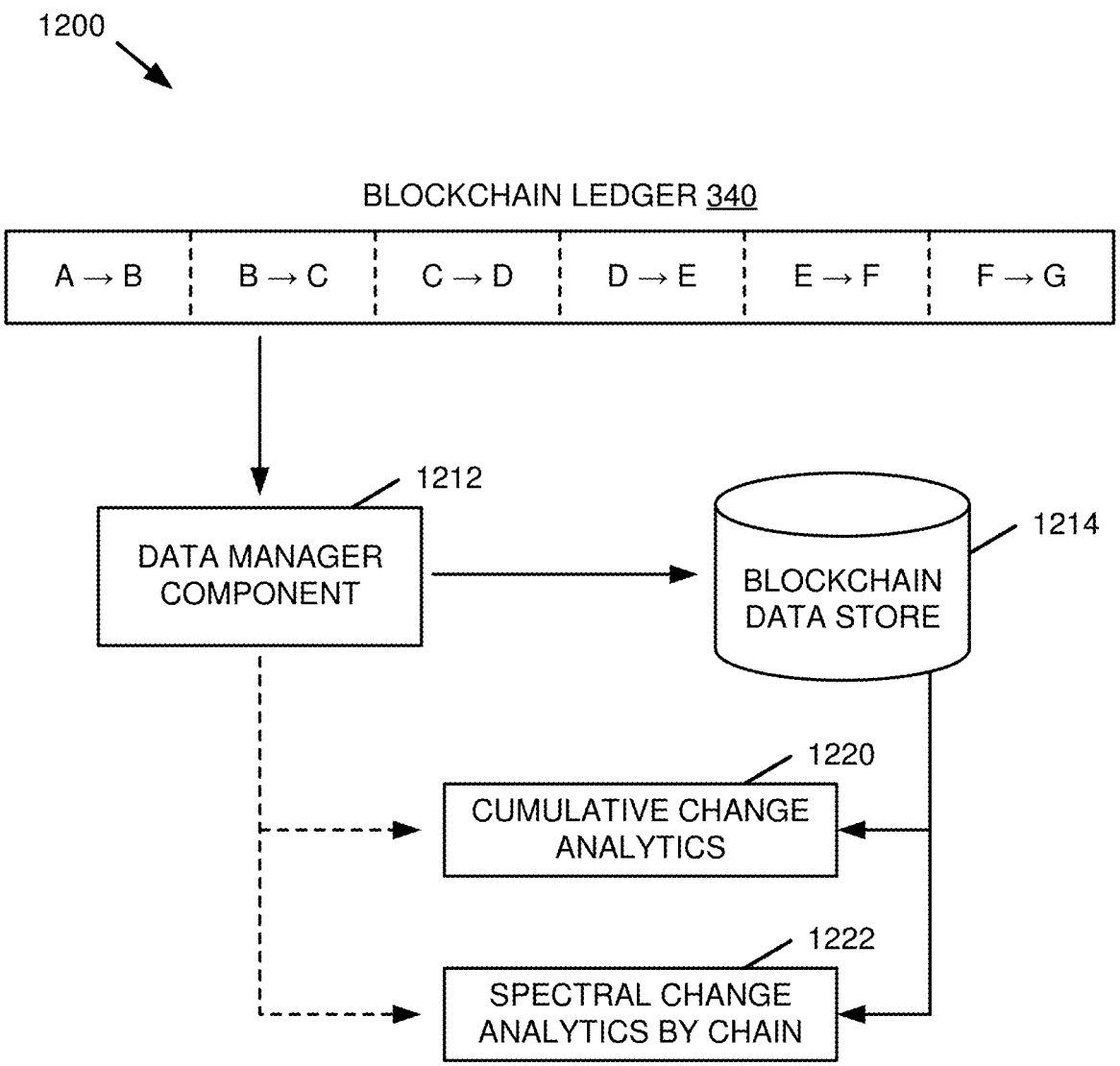
FIG. 12 is a block diagram depicting data management and analytics for a blockchain as maintained according to one or more embodiments described herein.

Referring next to FIG. 12, diagram 1200 depicts example data management and analytical operations that can be performed for a blockchain ledger 340 as maintained as described above. As shown in diagram 1200, information from the blockchain ledger 340 can be passed to a data manager component 1212, which can be utilized to keep track of the complete blockchain ledger 340 from end to end and analyze some or all of the chain. The data manager component can perform various operations, such as cumulative change analytics 1220 and/or spectral change analytics 1222, to analyze respective end-to-end transactions in the blockchain ledger 340 to monitor or predict early issues (e.g., *e-coli* contamination, gradual degradation in quality, etc.). In an aspect, information associated with the blockchain ledger 340, and/or additional information corresponding to analytics on the blockchain ledger as performed by the data manager component 1212, can be stored at a blockchain data store 1214.

Edible oils such as olive oil, canola oil, sunflower oil, corn oil, and/or nut oil begin to decompose as they are isolated from their natural environment. For instance, changes can occur which can cause a disagreeable taste, smell and appearance. Atmospheric oxidation is one such cause of deterioration. This oxidative rancidity is accelerated by exposure to heat, light, humidity and the presence of trace transition metals. During transit and storage, product may be exposed to excessive heat, light and/or humidity. Other possibilities include defective or broken packaging that allows exposure of the sample to oxygen and moisture. In an aspect, spectroscopic methods such as NIR spectroscopy and FTIR spectroscopy can provide quick and accurate methods of determining if degradation of a sample has occurred either during transit or storage.

Figure 13:
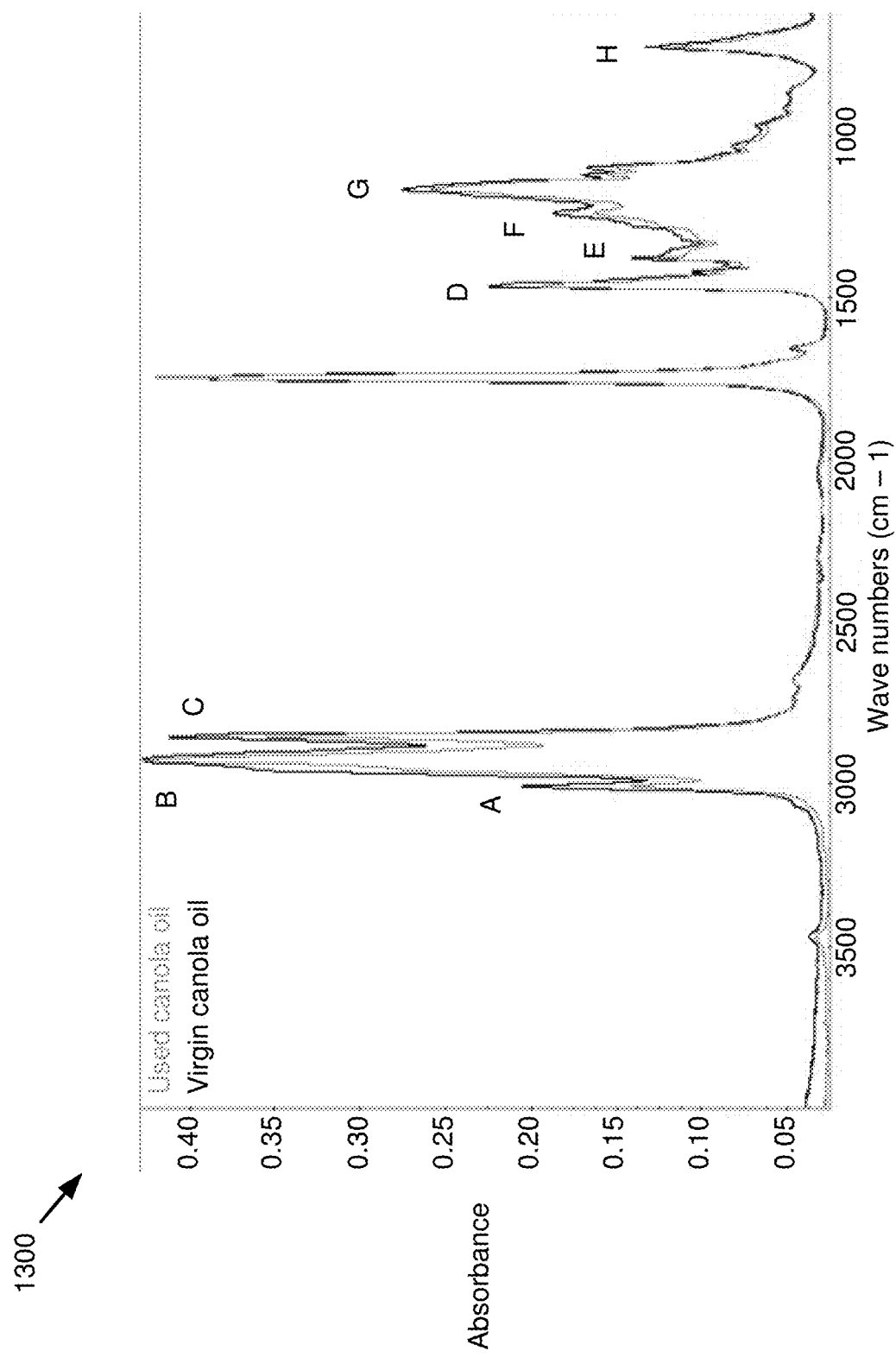
FIGS. 13-14 are diagrams depicting example spectral signature data corresponding to respective materials according to one or more embodiments described herein.

To simulate possible degradation due to excessive heat, a virgin sample of canola oil was used for frying and exposed to high heat in atmospheric conditions in a cast iron skillet. The intense heat of frying can cause an oxidizing thermal degradation in oils with the formation of decomposition products. Changes in the FTIR spectra of canola oil were observed after heating the canola oil during frying. FTIR spectra were collected and analyzed. Using a Pasteur pipette, oil samples of approximately 0.5 mL were placed on attenuated total reflectance (ATR) crystal for spectra collection. The spectra of canola oil before and after frying are shown by diagram 1300 in FIG. 13. Both spectra show the typical characteristic absorption bands for common vegetable oils. The weak peak in the region 3500-3400 cm−1 is attributed to O—H stretching from moisture in the canola oil. The peaks A, B and C in the region 3,100-2,800 cm−1 are due to C—H stretching mode. The C=O stretching is observable in the region 1,700-1,800 cm−1. The wavenumber region 1,400-900 cm−1 (peaks D-H) are associated with C—O—C stretching and C—H bending. Changes in the spectra are observed after frying. As shown in diagram 1300, a reduction in the absorption intensity for peaks A, C, and D-H and broadening of absorption peak B (e.g., increased FWHM) was observed. Here, peak A is attributed to the stretching vibration of the C—H link adjoining the C=C of polyunsaturated fats and is used to determine the unsaturation of edible oils. The infrared spectra show how frying produced a composition change in the oil, resulting in a decrease in the unsaturated component and subsequent decrease in the oils nutritional and monetary value.

Additionally, authenticity is a desirable quality for edible oils and fats. Because there is a big difference in prices of different types of oil and fat products, adulteration typically involves the replacement of high-cost ingredients with cheaper substitutes. In an example provided herein, virgin coconut oil was adulterated with canola oil. Virgin coconut oil is typically priced 10-20 times higher than common plant oils such as canola oil. Spectroscopic methods such NIR spectroscopy and FTIR spectroscopy can provide a quick and accurate method of determining if adulteration of a sample has occurred.

Figure 14:
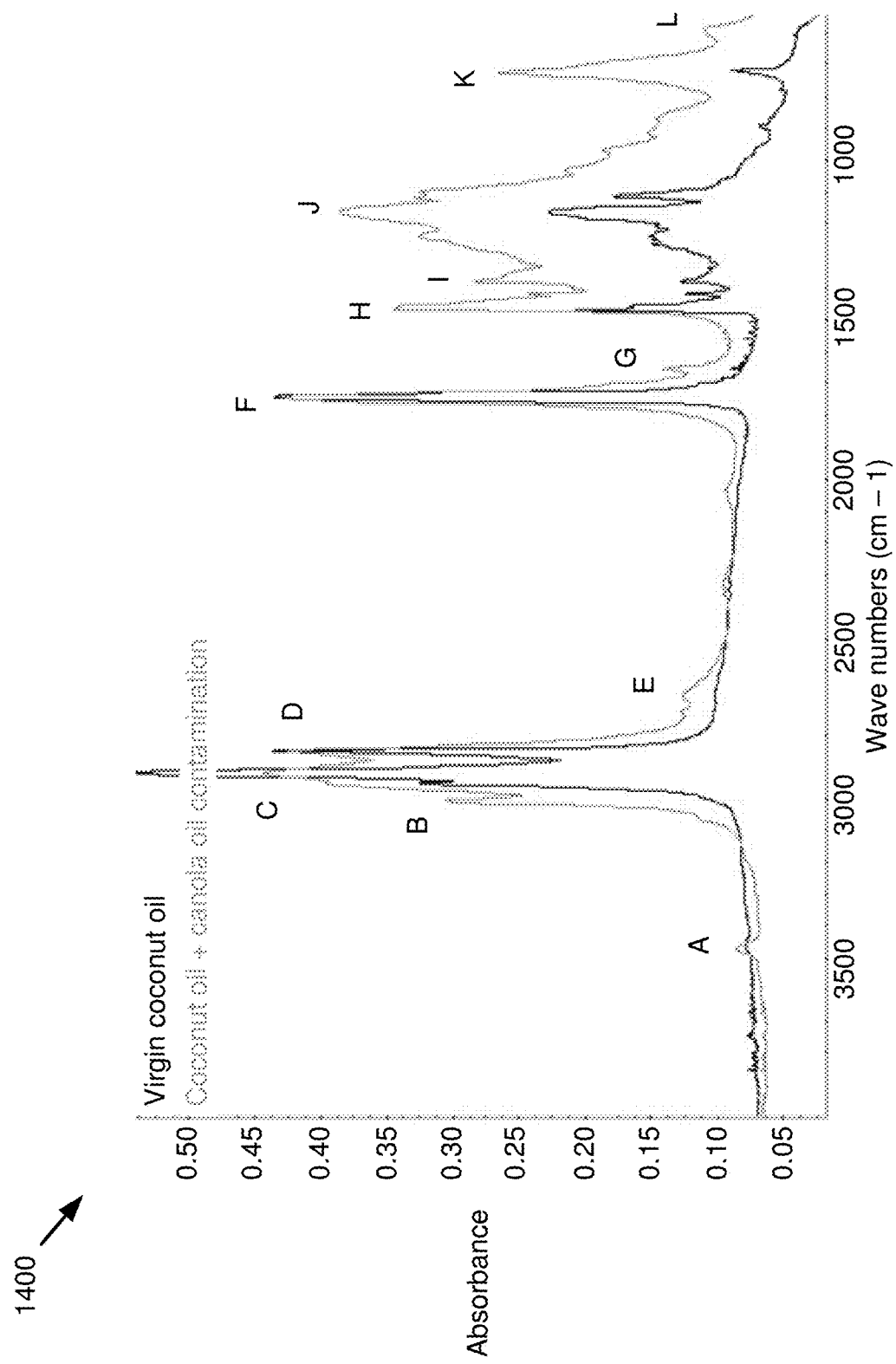

Shown in diagram 1400 in FIG. 14 is a comparison of the FTIR spectra of unadulterated virgin coconut oil and a 1:1 mixture of virgin coconut oil and canola oil. FTIR spectra were collected and analyzed. Using a Pasteur pipette, oil samples of approximately 0.5 mL were placed on ATR crystal for spectra collection. Both spectra show the typical characteristic absorption bands for common vegetable oils. The weak peak A in the region 3500-3400 cm−1 is attributed to O—H stretching from moisture in the canola oil, which is not observed in virgin coconut oil. The peaks B-E in the region 3,100-2,800 cm−1 are due to C—H stretching mode. The C=O stretching is observable in the region 1,700-1,800 cm−1 (peaks F and G). The wavenumber region 1,400-900 cm−1 (peaks H-L) are associated with C—O—C stretching and C—H bending. However, Compared with other edible fats and oils such as canola oil, virgin coconut oil has unique FTIR spectra. Peak A, which is attributed to moisture, is not observed in virgin coconut oil, nor is there an absorption at 3009 (peak B) and 1655 (peak G). Furthermore, at frequency region of 1120-1090 cm−1, VCO showed one peak (K) while canola oil exhibited two peaks (K and L). These differences can be exploited to determine if adulteration of virgin coconut oil has occurred. As shown in diagram 1400, after addition of 1:1 canola oil to coconut oil, new peaks A, B, E, G, and L are observed, peaks C and D broaden and are reduced in intensity, and peak intensity is increased for peaks F and H—K.

Figure 15:
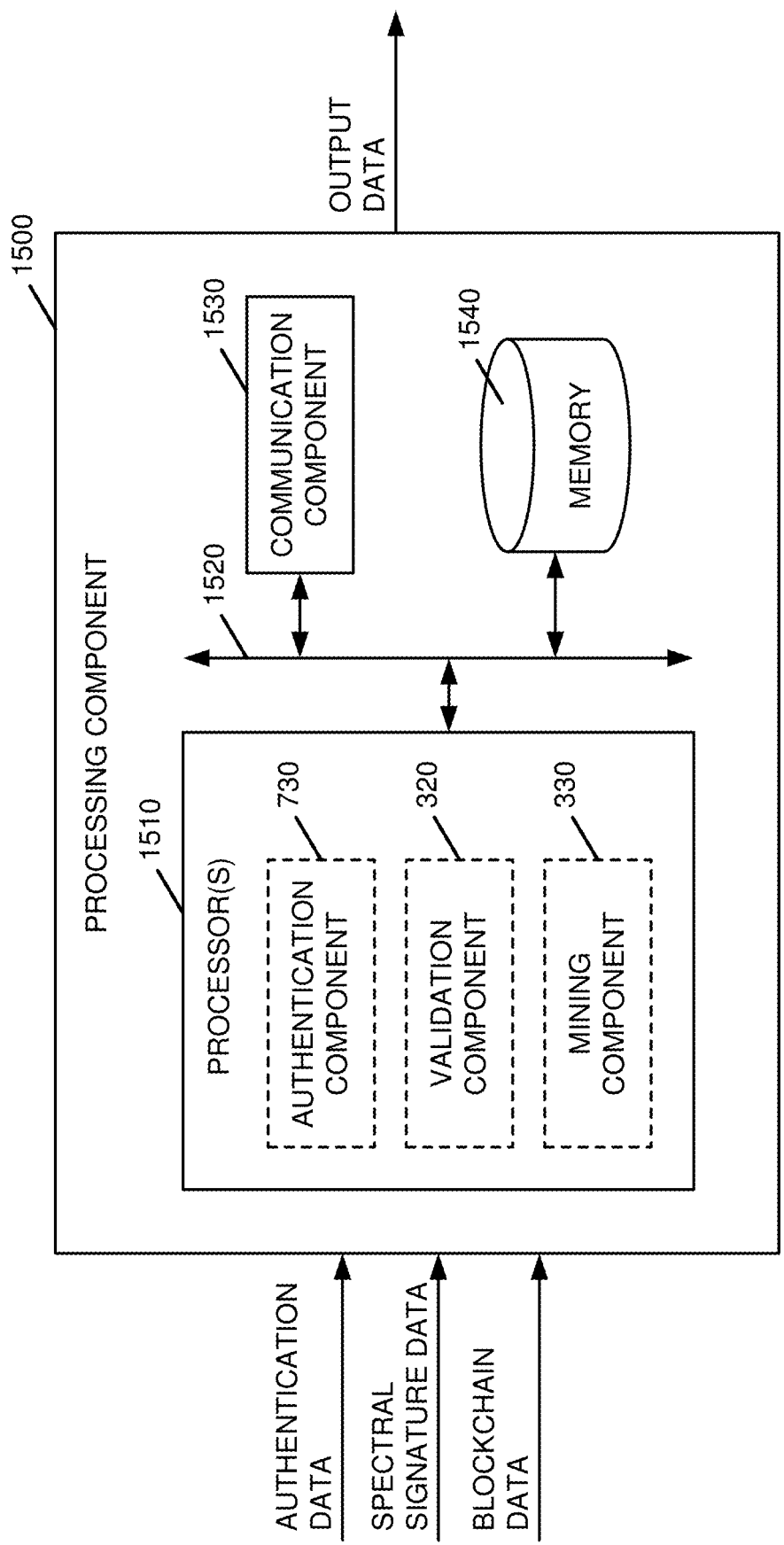
FIG. 15 is a block diagram of an example, non-limiting processing component according to one or more embodiments described herein.

Referring next to FIG. 15, a processing component 1500 that can be utilized to implement one or more aspects described herein is illustrated in accordance with one or more embodiments. Repetitive description of like elements employed in other embodiments described herein is omitted for sake of brevity.

As shown in FIG. 15, the processing component 1500 can be associated with at least one processor 1510 (e.g., a central processing unit, a graphical processing unit, etc.), which can be utilized to implement one or more of the authentication component 730, validation component 320, and/or mining component 330 as described above. The processor(s) 1510 can be connected via a data bus 1520 to one or more additional subcomponents of the processing component 1500, such as a communication component 1530 and/or a memory 1540. While the communication component 1530 is illustrated as implemented separately from the processor(s) 1510, the processor(s) 1510 in some embodiments can additionally be used to implement the communication component 1530. In still other embodiments, the communication component 1530 can be external to the processing component 1500 and communicate with the processing component 1500 via a separate communication link.

In various embodiments, the processing component 1500 can be or include hardware, software (e.g., a set of threads, a set of processes, software in execution, etc.) or a combination of hardware and software that performs a computing task (e.g., a computing task associated with received data). For example, processing component 1500 can execute spectrographic and/or cryptographic operations that cannot be performed by a human (e.g., are greater than the capability of a human mind). For example, the amount of data processed, the speed of processing of the data and/or the data types processed by processing component 1500 over a certain period of time can be respectively greater, faster and different than the amount, speed and data type that can be processed by a single human mind over the same period of time. For example, data processed by processing component 1500 can be raw data (e.g., raw textual data, raw numerical data, etc.) and/or compressed data (e.g., compressed textual data, compressed numerical data, etc.) associated with one or more computing devices. Moreover, processing component 1500 can be fully operational towards performing one or more other functions (e.g., fully powered on, fully executed, etc.) while also processing the above-referenced data.

The memory 1540 can be utilized by the processing component 1500 to store data utilized by the processing component 1500 in accordance with one or more embodiments described herein. Additionally or alternatively, the memory 1540 can have stored thereon machine-readable instructions that, when executed by the processing component 1500, cause the processing component (and/or one or more processors 1510 thereof) to implement the authentication component 730, validation component 320, and/or mining component 330 as described above.

Figure 16:
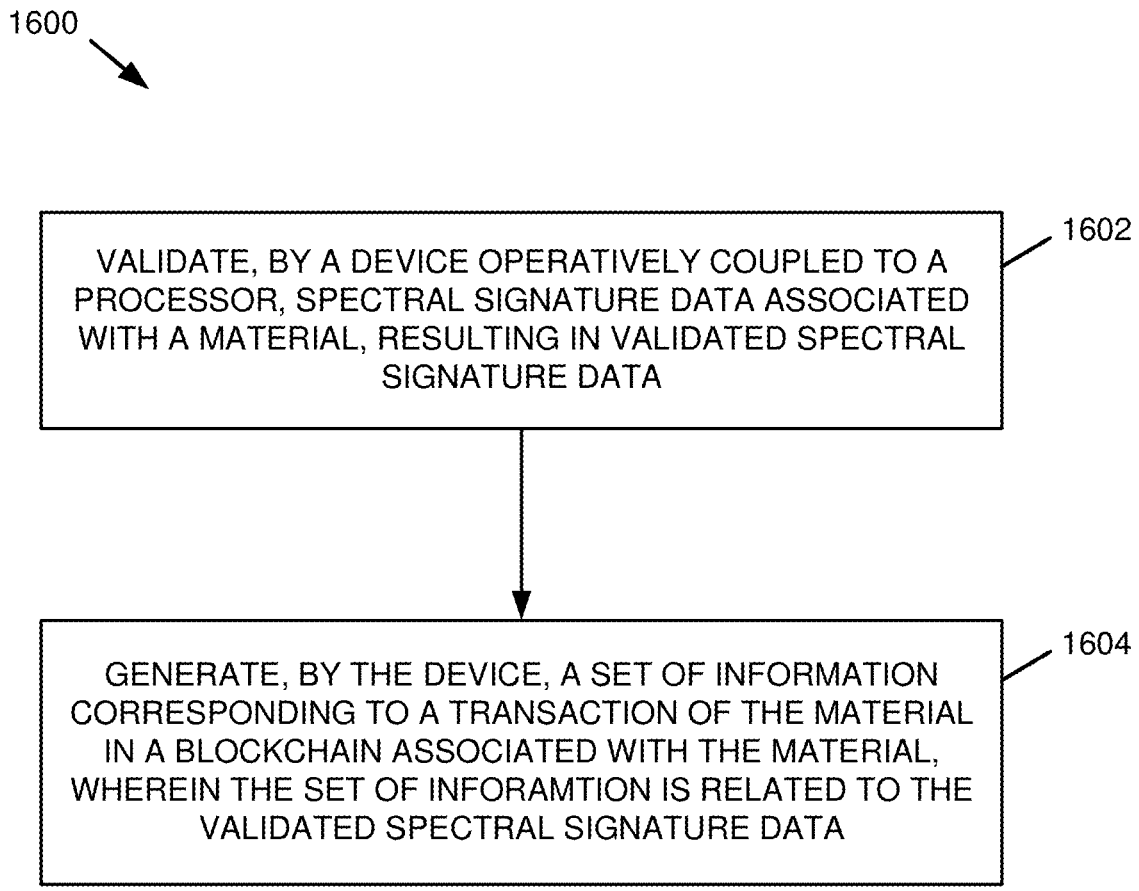
FIG. 16 is a flow diagram of an example, non-limiting computer-implemented method that facilitates blockchain management with spectral signature data according to one or more embodiments described herein.

FIG. 16 illustrates a flow diagram of an example, non-limiting computer-implemented method 1600 that facilitates blockchain management with spectral signature data in accordance with one or more embodiments described herein. Repetitive description of like elements employed in other embodiments described herein is omitted for sake of brevity.

At 1602, spectral signature data associated with a material (e.g., material 310) is validated (e.g., by the validation component 320). This validation results in validated spectral signature data.

At 1604, a set of information (e.g., a block in a blockchain, etc.) corresponding to a transaction of the material is generated (e.g., by the mining component 330) in a blockchain associated with the material. Here, the set of information is related to the validated spectral signature data obtained at 1602.

Figure 17:
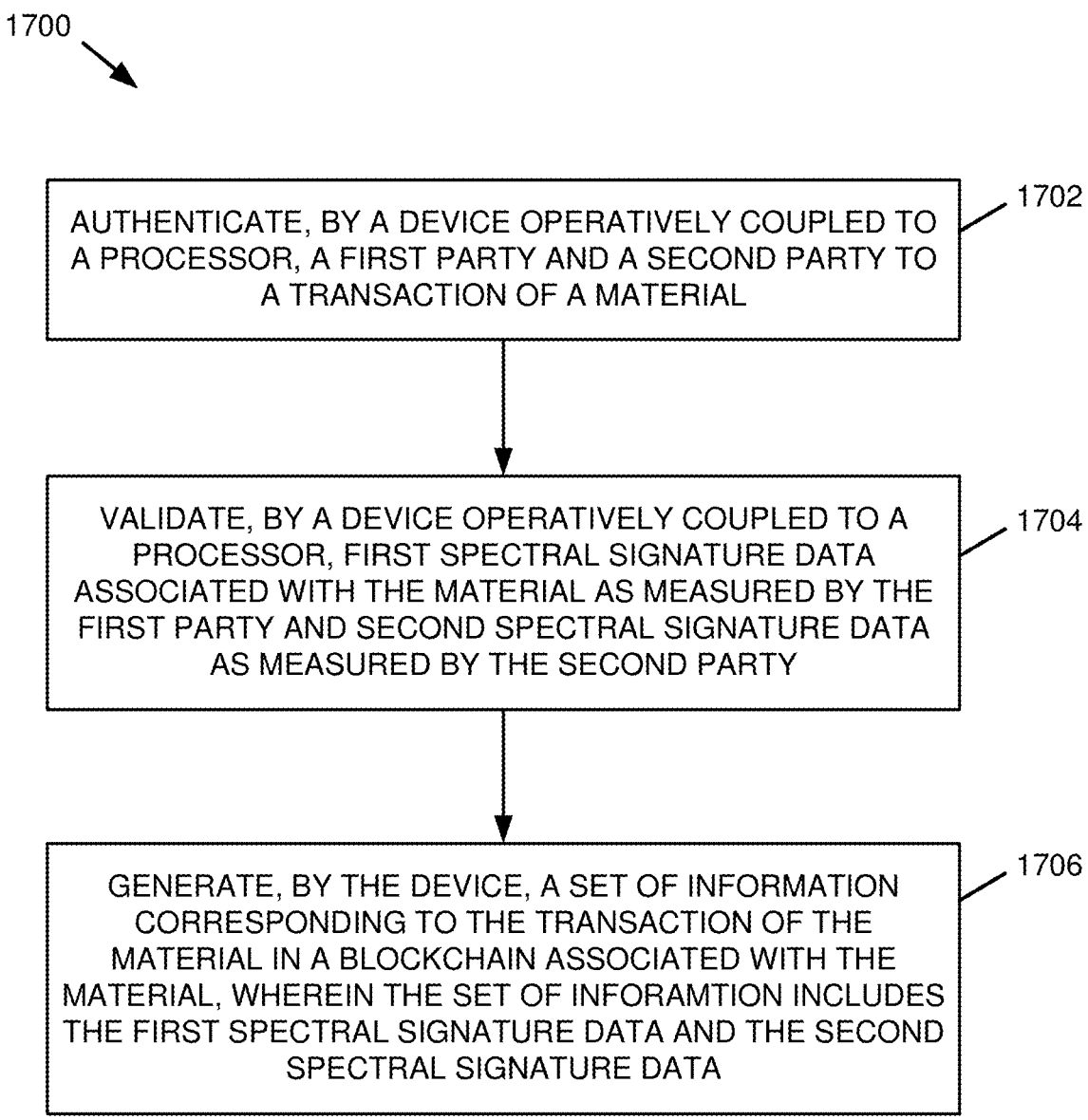
FIG. 17 is a flow diagram of an example, non-limiting computer-implemented method that facilitates management of a transaction of material according to one or more embodiments described herein.

FIG. 17 illustrates a flow diagram of an example, non-limiting computer-implemented method that facilitates management of a transaction of material (e.g., material 310) in accordance with one or more embodiments described herein. Repetitive description of like elements employed in other embodiments described herein is omitted for sake of brevity.

At 1702, a first party and a second party to a transaction of material (e.g., the sender device 710 and receiver device 720, respectively) are authenticated (e.g., by the authentication component 730).

At 1704, first spectral signature data associated with the material as measured by the first party (e.g., via the spectral scanning device 712) and second spectral signature data associated with the material as measured by the second party (e.g., via the spectral scanning device 722) are validated (e.g., by the validation component 320).

At 1706, a set of information corresponding to the transaction of the material is generated (e.g., by the mining component 330) in a blockchain associated with the material. Here, the set of information includes the first spectral signature data as measured by the first party and the second spectral signature data as measured by the second party.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components and/or an assignment component is established from a combination of electrical and mechanical components and circuitry, a human is unable to replicate or perform the subject data packet configuration and/or the subject communication between processing components and/or an assignment component. For example, a human is unable to generate data for transmission over a wired network and/or a wireless network between processing components and/or an assignment component, etc. Moreover, a human is unable to packetize data that can include a sequence of bits corresponding to information generated during a spatial computing process, transmit data that can include a sequence of bits corresponding to information generated during a spatial computing process, etc.

Figure 18:
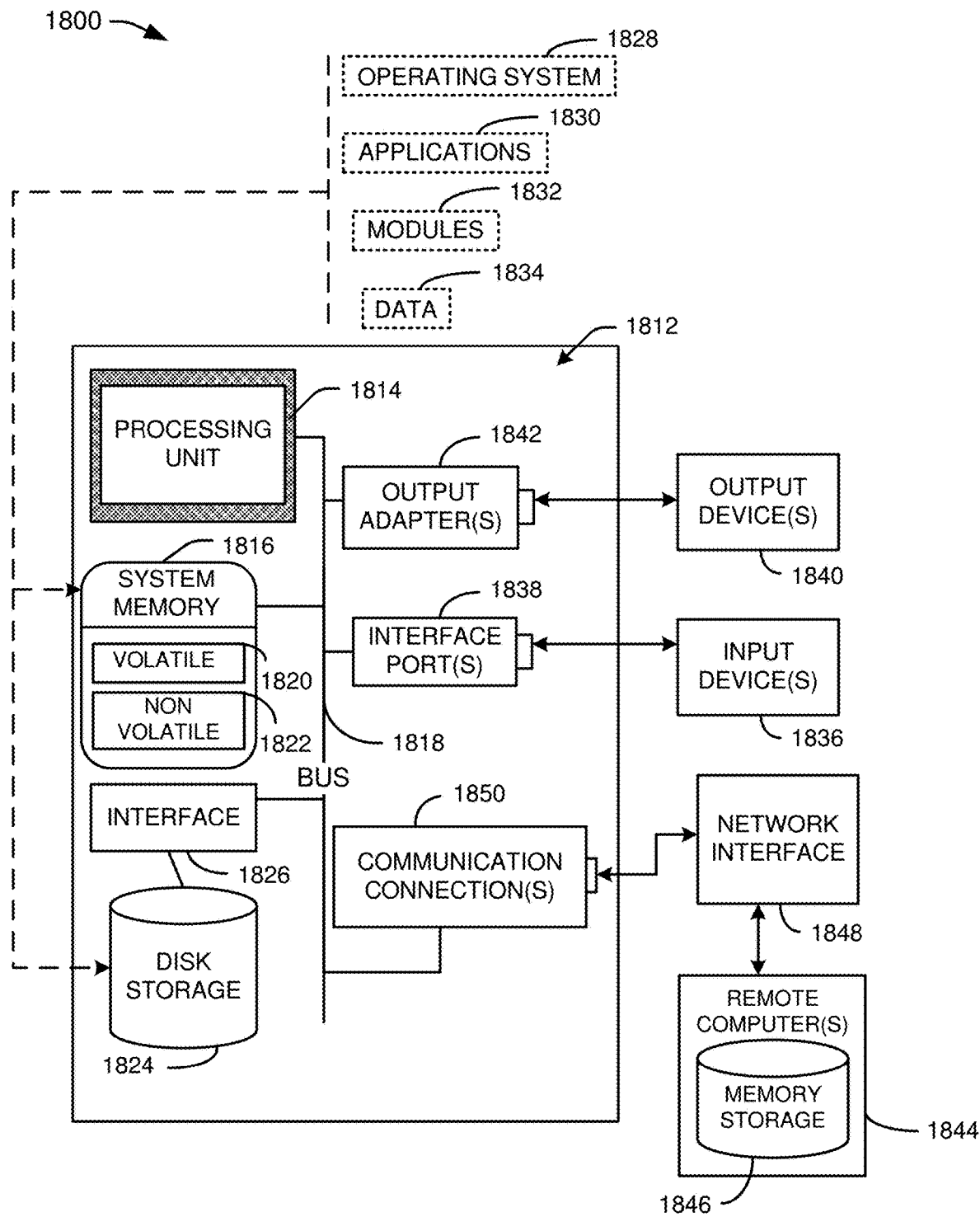
FIG. 18 illustrates a block diagram of an example, non-limiting operating environment in which one or more embodiments described herein can be implemented.

In order to provide a context for the various aspects of the disclosed subject matter, FIG. 18 as well as the following discussion are intended to provide a general description of a suitable environment in which the various aspects of the disclosed subject matter can be implemented. FIG. 18 illustrates a block diagram of an example, non-limiting operating environment in which one or more embodiments described herein can be facilitated. Repetitive description of like elements employed in other embodiments described herein is omitted for sake of brevity. With reference to FIG. 18, a suitable operating environment 1800 for implementing various aspects of this disclosure can also include a computer 1812. The computer 1812 can also include a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814. The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1816 can also include volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1812 can also include removable/non-removable, volatile/non-volatile computer storage media. FIG. 18 illustrates, for example, a disk storage 1824. Disk storage 1824 can also include, but is not limited to, devices like a magnetic disk drive, floppy disk drive, tape drive, Jaz drive, Zip drive, LS-100 drive, flash memory card, or memory stick. The disk storage 1824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used, such as interface 1826. FIG. 18 also depicts software that acts as an intermediary between users and the basic computer resources described in the suitable operating environment 1800. Such software can also include, for example, an operating system 1828. Operating system 1828, which can be stored on disk storage 1824, acts to control and allocate resources of the computer 1812. System applications 1830 take advantage of the management of resources by operating system 1828 through program modules 1832 and program data 1834, e.g., stored either in system memory 1816 or on disk storage 1824. It is to be appreciated that this disclosure can be implemented with various operating systems or combinations of operating systems. A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port can be used to provide input to computer 1812, and to output information from computer 1812 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a computer, a server, a router, a network PC, a workstation, a microprocessor based appliance, a peer device or other common network node and the like, and typically can also include many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1850 refers to the hardware/software employed to connect the network interface 1848 to the system bus 1818. While communication connection 1850 is shown for illustrative clarity inside computer 1812, it can also be external to computer 1812. The hardware/software for connection to the network interface 1848 can also include, for exemplary purposes only, internal and external technologies such as, modems including regular telephone grade modems, cable modems and DSL modems, ISDN adapters, and Ethernet cards.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a device operatively coupled to a processor, a difference between an encrypted first spectral signature data associated with a material and an encrypted second spectral signature data associated with the material; and
   predicting, by the device, based on the difference, a degradation of quality of a characteristic of the material that occurred from an environmental condition during a transit of the material between a first spectral scanning device that generated the encrypted first spectral signature data and a second spectral scanning device that generated the encrypted second spectral signature data, wherein the material is an oil, and the characteristic is an amount of unsaturated fat in the oil; and
   generating, by the device, a block of information corresponding to the material in a blockchain indicating that a transaction of the material is settled as validated, wherein the set of information comprises the prediction of the degradation of the quality of the characteristic of the material that occurred during the transit of the material between the first spectral scanning device and the second spectral scanning device.

2. The computer-implemented method of claim 1, further comprising:
   authenticating, by the device, the first spectral scanning device associated with a first party to the transaction and the second spectral scanning device associated with a second party to the transaction.

3. The computer-implemented method of claim 2, wherein the generating the block of information further comprises including a first identity of the first party and a second identity of the second party in the block of information.

4. The computer-implemented method of claim 2, further comprising validating a first spectral signature from the encrypted first spectral signature data.

5. The computer-implemented method of claim 4, further comprising validating a second spectral signature from the encrypted second spectral signature data.

6. The computer-implemented method of claim 5, wherein the first spectral signature and the second spectral signature comprise the first identity and the second identity, respectively.

7. The computer-implemented method of claim 4, wherein the first spectral signature comprises a near-infrared signature for the material, and further comprising verifying, by the device, that the near-infrared signature is in a set of valid signatures.

8. A system comprising:
   a memory that stores computer executable components; and
   a processor that executes computer executable components stored in the memory, wherein the computer executable components comprise:
   a validation component that:
   determines a difference between an encrypted first spectral signature data associated with a material and an encrypted second spectral signature data associated with the material; and
   predicts, based on the difference, a degradation of quality of a characteristic of the material that occurred from an environmental condition during a transit of the material between a first spectral scanning device that generated the encrypted first spectral signature data and the second spectral scanning device that generated the encrypted second spectral signature data wherein the material is an oil, and the characteristic is an amount of unsaturated fat in the oil; and
   generates a block of information corresponding to the material in a blockchain indicating that a transaction of the material is settled as validated, wherein the set of information comprises the prediction of the degradation of the quality of the characteristic of the material that occurred during the transit of the material between the first spectral scanning device and the second spectral scanning device.

9. The system of claim 8, wherein the computer executable components further comprise:
   an authentication component that authenticates the first spectral scanning device associated with a first party to the transaction and the second spectral scanning device associated with a second party to the transaction.

10. The system of claim 9, wherein validation component includes a first identity of the first party and a second identity of the second party in the block of information.

11. The system of claim 9, wherein validation component validates a first spectral signature from the encrypted first spectral signature data.

12. The system of claim 11, wherein validation component validates a second spectral signature from the encrypted second spectral signature data.

13. The system of claim 12, wherein the first spectral signature and the second spectral signature comprise the first identity and the second identity, respectively.

14. The system of claim 11, wherein the first spectral signature comprises a near-infrared signature for the material, and further comprising verifying, by the device, that the near-infrared signature is in a set of valid signatures.

15. A computer program product for monitoring integrity of a supply chain, the computer program product comprising a computer readable storage medium having program instructions embodied therewith, the program instructions executable by a processor to cause the processor to:
   determine a difference between an encrypted first spectral signature data associated with a material and an encrypted second spectral signature data associated with the material; and
   predict, based on the difference, a degradation of quality of a characteristic of the material that occurred during a transit of the material between a first spectral scanning device that generated the encrypted first spectral signature data and the second spectral scanning device that generated the encrypted second spectral signature data based on the difference, wherein the material is an oil, and the characteristic is an amount of unsaturated fat in the oil; and
   generate a block of information corresponding to the material in a blockchain indicating that a transaction of the material is settled as validated, wherein the set of information comprises the prediction of the degradation of the quality of the characteristic of the material that occurred from an environmental condition during the transit of the material between the first spectral scanning device and the second spectral scanning device.

16. The computer program product of claim 15, wherein the program instructions further cause the processor to:
   authenticate the first spectral scanning device associated with a first party to the transaction and the second spectral scanning device associated with a second party to the transaction.

17. The computer program product of claim 16, wherein the program instructions further cause the processor to:
   include a first identity of the first party and a second identity of the second party in the block of information.

18. The computer program product of claim 16, wherein the program instructions further cause the processor to:
   validate a first spectral signature from the encrypted first spectral signature data.

19. The computer program product of claim 18, wherein the program instructions further cause the processor to:
   validate a second spectral signature from the encrypted second spectral signature data.

20. The computer program product of claim 19, wherein the first spectral signature and the second spectral signature comprise the first identity and the second identity, respectively.

* * * * *